(12) United States Patent
Pekonen

(10) Patent No.: US 7,130,313 B2
(45) Date of Patent: Oct. 31, 2006

(54) TIME-SLICE SIGNALING FOR BROADBAND DIGITAL BROADCASTING

(75) Inventor: Harri Pekonen, Raisio (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/075,150

(22) Filed: Feb. 14, 2002

(65) Prior Publication Data

US 2003/0152107 A1    Aug. 14, 2003

(51) Int. Cl.
*H04J 3/16* (2006.01)
*H04J 3/24* (2006.01)

(52) U.S. Cl. ............ 370/473; 370/311; 370/468; 370/474

(58) Field of Classification Search ........... 370/311, 370/473, 507–509, 512, 514, 528, 498, 503–505, 370/537, 350, 459, 457; 455/522
See application file for complete search history.

(56) References Cited

U.S. PATENT DOCUMENTS

| | | | |
|---|---|---|---|
| 4,449,248 A | 5/1984 | Leslie et al. | |
| 4,601,586 A | 7/1986 | Bahr et al. | |
| 5,224,152 A | 6/1993 | Harte | |
| 5,307,376 A | 4/1994 | Castelain et al. | |
| 5,359,607 A | 10/1994 | Nguyen et al. | |
| 5,371,734 A * | 12/1994 | Fischer | 370/311 |
| 5,420,863 A | 5/1995 | Taketsugu et al. | |
| 5,513,246 A | 4/1996 | Jonsson et al. | |
| 5,537,409 A * | 7/1996 | Moriyama et al. | 370/471 |
| 5,539,925 A | 7/1996 | Yli-Kotila et al. | |
| 5,568,513 A | 10/1996 | Croft et al. | |
| 5,613,235 A | 3/1997 | Kivari | |
| 5,657,313 A | 8/1997 | Takahashi et al. | |
| 5,710,756 A | 1/1998 | Pasternak et al. | |
| 5,732,068 A | 3/1998 | Takahashi et al. | |
| 5,745,860 A | 4/1998 | Kallin | |
| 5,764,700 A | 6/1998 | Makinen | |
| 5,799,033 A | 8/1998 | Baggen | |
| 5,822,313 A | 10/1998 | Malek et al. | |
| 5,870,675 A | 2/1999 | Tuutijärvi et al. | |
| 5,883,899 A | 3/1999 | Dahlman et al. | |
| 5,886,995 A | 3/1999 | Arsenault et al. | |

(Continued)

FOREIGN PATENT DOCUMENTS

DE     19910023     9/2000

(Continued)

OTHER PUBLICATIONS

Digital Video Broadcasting (DVB); Specification for Service Information (Si) in DVB Systems, European Telecommunications Standard Institute, May 2003, 1-93, ETSI EN 300 468 v.1.5.1, France.

(Continued)

*Primary Examiner*—Chi Pham
*Assistant Examiner*—Justin M. Philpott
(74) *Attorney, Agent, or Firm*—Banner & Witcoff, Ltd.

(57) ABSTRACT

In a digital broadband broadcasting system, in which information is transmitted and received periodically in bursts to reduce receiver power consumption, time-slice information is provided from the transmitter to the receiver. The time-slice information can include information from which the receiver can determine when a subsequent transmission burst will be transmitted. The time-slice information can include a burst duration, an amount of time between original bursts, the time between an original burst and a copy of the burst, and numbering of original bursts. This type of time-slice information can be placed into packet headers, such as one or more bytes reserved, but not used, for media access control addressing.

51 Claims, 17 Drawing Sheets

U.S. PATENT DOCUMENTS

| | | | |
|---|---|---|---|
| 5,923,655 A * | 7/1999 | Veschi et al. | 370/394 |
| 5,936,965 A | 8/1999 | Doshi et al. | |
| 5,970,059 A | 10/1999 | Ahopelto et al. | |
| 5,995,845 A | 11/1999 | Lardennois | |
| 6,047,181 A | 4/2000 | Suonvieri | |
| 6,088,412 A | 7/2000 | Ott | |
| 6,167,248 A | 12/2000 | Hamalainen et al. | |
| 6,175,557 B1 * | 1/2001 | Diachina et al. | 370/311 |
| 6,226,278 B1 | 5/2001 | Bursztenj et al. | |
| 6,256,357 B1 | 7/2001 | Oshima | |
| 6,262,982 B1 | 7/2001 | Donahue et al. | |
| 6,262,990 B1 * | 7/2001 | Ejiri | 370/537 |
| 6,266,536 B1 | 7/2001 | Janky | |
| 6,282,209 B1 | 8/2001 | Kataoka et al. | |
| 6,285,686 B1 | 9/2001 | Sharma | |
| 6,295,450 B1 | 9/2001 | Lyer | |
| 6,335,766 B1 | 1/2002 | Twitchell et al. | |
| 6,339,713 B1 * | 1/2002 | Hansson et al. | 370/311 |
| 6,356,555 B1 | 3/2002 | Rakib et al. | |
| 6,477,382 B1 * | 11/2002 | Mansfield et al. | 370/311 |
| 6,490,727 B1 | 12/2002 | Nazarathy et al. | |
| 6,628,632 B1 | 9/2003 | Dolan | |
| 6,766,168 B1 | 7/2004 | Lim | |
| 6,807,235 B1 * | 10/2004 | Yano et al. | 375/259 |
| 6,956,868 B1 * | 10/2005 | Qiao | 370/466 |
| 2001/0031626 A1 | 10/2001 | Lindskog et al. | |
| 2002/0010763 A1 | 1/2002 | Salo et al. | |
| 2002/0025777 A1 | 2/2002 | Kawamata et al. | |
| 2003/0067943 A1 | 4/2003 | Arsenault et al. | |
| 2003/0115356 A1 * | 6/2003 | Block et al. | 709/236 |
| 2004/0097194 A1 | 5/2004 | Karr et al. | |
| 2004/0102213 A1 | 5/2004 | Karr et al. | |
| 2004/0102214 A1 | 5/2004 | Karr et al. | |
| 2004/0102215 A1 | 5/2004 | Karr et al. | |
| 2004/0242163 A1 | 12/2004 | Karr et al. | |

FOREIGN PATENT DOCUMENTS

| | | |
|---|---|---|
| EP | 0577322 A | 1/1994 |
| WO | WO 00/36861 | 6/2000 |
| WO | WO 00/67449 A1 | 11/2000 |
| WO | WO 01/31963 | 5/2001 |
| WO | WO 01/72076 | 9/2001 |
| WO | WO 01/97538 | 12/2001 |
| WO | WO 02/01879 | 1/2002 |
| WO | WO 02/03728 | 1/2002 |
| WO | WO 02/03729 | 1/2002 |

OTHER PUBLICATIONS

Digital Video Broadcasting (DVB); DVB specification for data broadcasting, European Telecommuncations Standard Institute, Jan. 2003, 1-58, ETSI EN 301 192 v1.3.1, France.

Deering S., Host Extensions for IP Multicasting, Network Working Group, Aug. 1989, 1-16, Stanford, California.

Apostolis K. Salkintzis et al. "Performance Analysis of a Downlink Mac Protocol with Power-Saving Support", IEEE Transactions on Vehicular Technology, vol. 49, No. 3, May 2000, pp. 1029-1040.

Apostolis K. Salkintzis et al. "An In-Band Power-Saving Protocol for Mobile Data Networks" IEEE Transactions on Communications, vol. 46, No. 9, Sep. 1998, pp. 1194-1205.

Digital Video Broadcasting (DVB); DVB specification for Data Broadcasting, European Broadcasting Union, En 301 192 v1.2.1 (Jun. 1999).

Draft Report of the 52nd Meeting of DVB GBS, EBU Headquarters, Geneva, Jun. 25/27, 2002. pp. 1-12.

International Search Report for PCT/US03/00038 mailed Sep. 8, 2003.

Huang, Su and Chao, "Architectures and Handoff Schemes for CATV-Based Personal Communications Network", *Infocom '98, 17th Annual Joint Conference of the IEEE Computer and Communications Societies*, IEEE San Francisco, CA, Mar. 1998, pp. 748-755.

International Search Report dated Jan. 29, 2004.

Falk, Aaron David, A System Design for a Hybrid Network Data Communications Terminal Using Asymmetric TCP/IP to Support Internet Applications, Master Of Science Thesis, Spring, 1994. URL:http://www.interactivedata.com/images/IDC_timeline.swf>.

[retrieved on Mar. 14, 2005] Retrieved from the internet URL:http://www.interactivedata.com/images/IDC_timeline.swf>.

Ankeny, Jason, "Safe at Any Speed" [retrieved on Mar. 14, 2005] Retrieved from the internet <URL:http://wireless/review.com/ar/wireless_safe_speed/.

"Mobility and the Implications of Wireless Technologies" [retrieved on Mar. 14, 2005] Retrieved from the internet <URL:http://www.wws.princeton.edu/cgi-bin/byteserv.prl/~ota/disk1/1995/9547/954705.PDF.

[retrieved on Mar. 14, 2005] Retrieved from the internet <URL:http://www.esignal.com/default.asp.

"The New, Even Better Quo Trek!" [retrieved on Mar. 14, 2005] Retrieved from the internet <URL:http://www.quotrek.com/.

Vaidya, Nitin H., Hameed, Sohail, "Scheduling data broadcast in asymmetric communication environments" [retrieved on Mar. 14, 2005] Retrieved from the internet <URL:http://delivery.acm.org/10.1145/310000/304737/p171-vaidya.pdf?key1=304737&key2=7986299011&coli=GUIDE&dl=ACM&CFID=39896970&CFTOKEN=31164323.

Petrovski, E. et al. "New Flexible Network-based RTK Service in Japan" [retrieved on Mar. 14, 2005] Retrieved from the internet <URL:http://www.geomatics.ucalgary.ca/~lachapel/00GPSIP.pdf.

"National Semiconductor Delivers Complete Solution for Microsoft's New Smart Personal Objects Technology Initiative" [retrieved on Mar. 14, 2005] Retrieved from the internet <URL:http://www.national.com/news/item/0,1735,829,00.html_National.

Baltuck, Mitchell S. Unidata's Internet Data Distribution (IDD) System: Two Years of Data Delivery [retrieved on Mar. 14, 2005] Retrieved from the internet <URL:http://www.unidata.ucar.edu/projects/idd/iips97.mitch.html.

Fulker, Dave. "Principles Underlying Internet Data Distribution" [retrieved on Mar. 14, 2005] Retrieved from the internet >URL:http://www.unidata.ucar.edu/projects/idd/plans/principles.html.

International Search Report for Appl. No. EP 03 70 5641 dated Feb. 14, 2005.

W. Kellerer, "*A Versatile Network Independent Server Architecture for Multimedia Information and Communication Services,*" in Proceedings of SmartNet2000, Sixth IFIP International Conference on Intelligence in Networks, Vienna, Austria, Sep. 18-22, 2000, pp. 1-20.

W. Kellerer, P. Sties, and J. Eberspächer, "*IP based enhanced Data Casting Services over Radio Broadcast Networks,*", in Proceedings of ECUMN 2000, IEEE European Conference on Universal Multiservice Networks, Colmar, France, Oct. 2-4, 2000, pp. 1-9.

T. Imielinski and B.R. Badrinath, "*Mobile Wireless Computing: Challenges in Data Management,*" Communications of the ACM, vol. 37, Issue 10 (Oct. 1994), Year of Publication: 1994, ISSN:0001-0782, pp. 18-28.

W. Klingenberg and A. Neutal, " *MEMO: A Hybrid DAB/GSM Communication System for Mobile Interactive Multimedia Services,*" Proc. of ECMAST '98, Berlin, Germany, 1998, Lecture Notes in Computer Science vol. 1425, Springer-Verlag Berlin Heidelberg New York, pp. 493-503.

\* cited by examiner

| Syntax | No. of bits |
|---|---|
| Data_broadcast_descriptor () { | |
| Descriptor_tag | 8 |
| Descriptor_length | 8 |
| Data_broadcast_id          80 | 16 |
| Component_tag | 8 |
| Selector_length | 8 |
| For (I=0; I<selector_length, I++) { | |
| Selector_byte | 8 |
| } | |
| ISO_639_language_code | 24 |
| Text_length | 8 |
| For (I=0, I<text_length, i++) { | |
| Text_char | 8 |
| } | |
| } | |

Fig. 7

| Syntax | No. of bits |
|---|---|
| Datagram_section() { | |
| Table_id | 8 |
| Section_syntax_indicator | 1 |
| Private_indicator | 1 |
| Reserved | 2 |
| Section_length | 12 |
| MAC_address_6              90-6 | 8 |
| MAC_address_5              90-5 | 8 |
| Reserved | 2 |
| Payload_scrambling_control | 2 |
| Address_scrambling_control | 2 |
| LLC_SNAP_flag | 1 |
| Current_next_indicator | 1 |
| Section_number | 8 |
| Last_section_number | 8 |
| MAC_address_4              90-4 | 8 |
| MAC_address_3              90-3 | 8 |
| MAC_address_2              90-2 | 8 |
| MAC_address_1              90-1 | 8 |
| If (LLC_SNAP_flag == '1') { | |
| LLC_SNAP() | |
| } else { | |
| for (j=0;j<N1;j++){ | |
| IP_datagram_data_byte | 8 |
| } | |
| } | |
| If (section_number == last_section_number) { | |
| For (j=0;j<N2;j++) { | |
| Stuffing_byte | 8 |
| } | |
| } | |
| If (section_syntax_indicator=='0'){ | |
| Checksum | 32 |
| } else { | |
| CRC_32 | 32 |
| } | |
| } | |

Fig. 8

| Syntax | | No. of bits |
|---|---|---|
| Multiprotocol_encapsulation_info () { | | |
| MAC_address_range | 92 | 3 |
| MAC_IP_mapping_flag | 94 | 1 |
| Alignment_indicator | | 1 |
| Reserved | 96 | 3 |
| Max_section_per_datagram | | 8 |
| } | | |

Fig. 9

| MAC_address_range | Valid MAC_address bytes |
|---|---|
| 0x00 | Reserved |
| 0x01 | 6 |
| 0x02 | 6, 5 |
| 0x03 | 6, 5, 4 |
| 0x04 | 6, 5, 4, 3 |
| 0x05 | 6, 5, 4, 3, 2 |
| 0x06 | 6, 5, 4, 3, 2, 1 |
| 0x07 | Reserved |

Fig. 10

Network Operator Elastic Buffer (FIFO-type) Data Characteristics

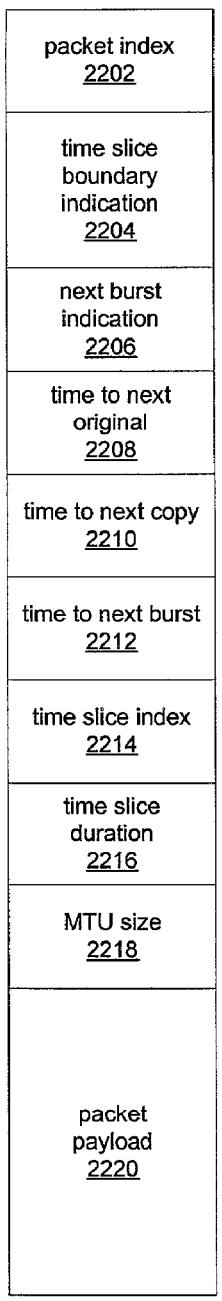
Fig. 22
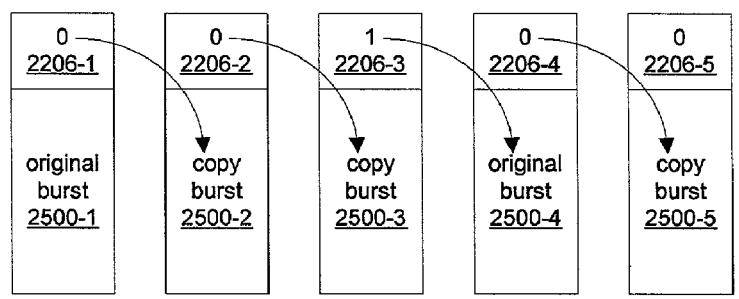
Fig. 23
Fig. 24
Fig. 25

TIME-SLICE SIGNALING FOR BROADBAND DIGITAL BROADCASTING

FIELD OF THE INVENTION

This invention relates to transmission of audio data, video data, control data, or other information and, in particular, to signaling time-slice information for efficiently using information broadcasting resources.

BACKGROUND OF THE INVENTION

Video streaming, data streaming, and broadband digital broadcast programming is increasing in popularity in network applications. An example of a digital broadband broadcast network enjoying popularity in Europe and elsewhere world-wide is Digital Video Broadcast (DVB) which, in addition to the delivery of televisual content, is also capable of delivering data. The Advanced Television Systems Committee (ATSC) has also defined a digital broadband broadcast network. Both ATSC and DVB use a containerization technique in which content for transmission is placed into MPEG-2 packets that act as data containers. Thus, the containers can be used to transport any suitably digitized data including, but not limited to High Definition TV, multiple channel Standard definition TV (PAL/NTSC or SECAM), broadband multimedia data and interactive services, and the like. Transmitting and receiving digital broadband programming usually requires the transmission and reception equipment to be powered up continuously so as to be able to send or receive all the streaming information. However, in the current state of the art, power consumption levels, especially in the front end of a digital broadcast receiver, are relatively high. Reducing these power-consumption levels would therefore improve the operating efficiency of the broadcasting equipment.

SUMMARY OF THE INVENTION

To reduce receiver power consumption in a digital broadband broadcasting system, information is transmitted and received periodically in bursts. The term "periodically" refers to something that happens repeatedly at intervals that can change. In such a system, a transmitter can communicate to a receiver accurate information regarding when the receiver should expect to receive transmission bursts. Providing this type of information is referred to as providing or signaling time-slice information. Based on received time-slice signaling information, the receiver can be powered down, which can include being put into a reduced power-consumption state, during idle time between receiving transmission bursts. This advantageously results in reduced power consumption by the receiver.

In accordance with various illustrative embodiments of the invention, time-slice information is added to packet headers. The time-slice information may be relative timing information that corresponds to an amount of time between transmission of a current packet of a current burst from a data service and transmission of a first-transmitted packet of a subsequent burst from the data service.

A transmitter-system component, such as a multi-protocol encapsulator, can encode time-slice information while forming packets to be transmitted in bursts. The encapsulator can include an elastic buffer that stores data from one or more information service providers. Such an elastic buffer can be large enough to store at least two bursts worth of information from substantially all of the information services for which the transmitter is transmitting bursts of information. When the encapsulator has received at least two bursts worth of information from an information service provider and has received whatever data the transmitter will send between two such bursts, the encapsulator can determine how much time will elapse between transmission of the first burst and transmission of the second burst. This time information can be added to one or more of the packets of a transmission burst. In this manner, encapsulated packets can carry accurate information regarding how much time will elapse between receiving a current burst and receiving a subsequent burst.

Time-slice information can include the duration of a burst, an amount of time between original bursts, the time between an original burst and a copy of the burst, and numbering of original bursts. This type of time-slice information can be placed into packet headers, such as one or more bytes reserved, but not used, for media access control addressing.

Computer-executable instructions for signaling time-slice information, in accordance with the invention, are stored on computer-readable media.

BRIEF DESCRIPTION OF THE DRAWINGS

The invention is illustrated by way of example and not limited in the accompanying figures in which like reference numerals indicate similar elements and in which:

FIG. 7 is a table that lists fields and their respective sizes for a data broadcast descriptor;

FIGS. 8 and 9 are tables that show various multi protocol encapsulation-related information;

FIG. 10 shows coding related to the use of various media access control addressing bytes;

FIG. 22 shows an MPE packet including an MPE packet payload and a set of time-slicing parameters that can be used in various permutations and combinations for signaling time-slice information.

FIG. 23 shows down numbering of MPE packets within a time slice of MPE packets.

FIG. 24 shows a time-slice-boundary indication of a packet to indicate that the packet is the first packet of the burst of packets.

FIG. 25 shows next burst indications that indicate whether the next burst will be a copy of a previously transmitted burst.

DETAILED DESCRIPTION OF THE INVENTION

Figure 1:
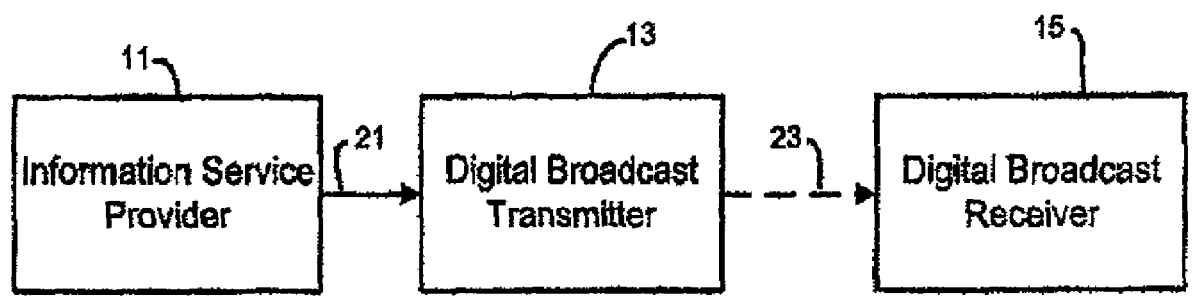
FIG. 1 shows a simplified diagram of a conventional streaming digital broadcasting system.

FIG. 1 is a simplified diagram of a conventional streaming digital broadcasting system 10 in which an information signal 21 originating at an information service provider 11 is transmitted to a client accessing a digital broadcast receiver 15. The information signal 21 is typically sent from the service provider 11 to a transmitter 13 over a link, which can be an Internet link. The transmitter 13 broadcasts the information signal to the receiver 15 as a streaming signal 23, typically by means of a broadcast antenna (not shown).

Figure 2:
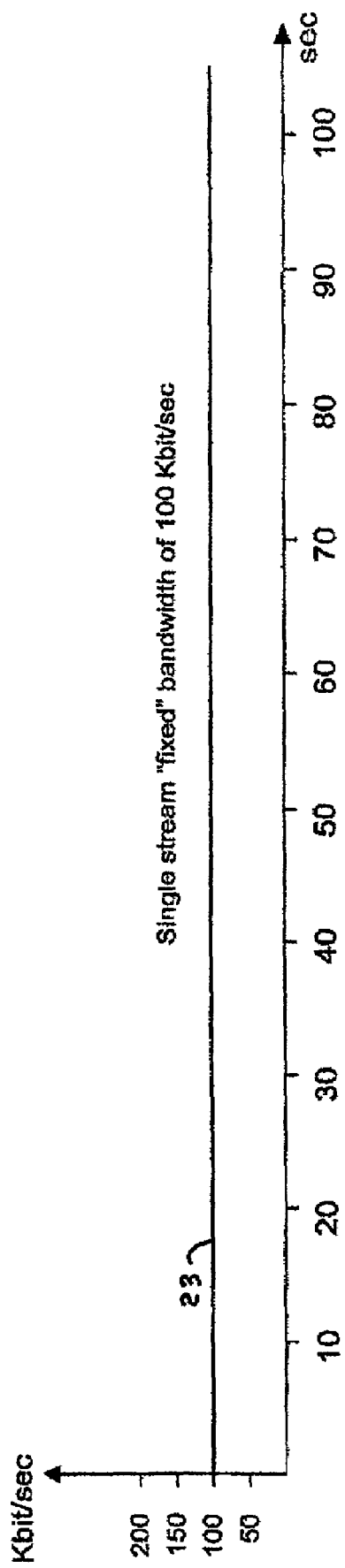
FIG. 2 shows a waveform of the streaming signal output by the conventional digital broadcasting system of FIG. 1.

In a conventional signal transmission application, the transmitter 13 provides a continuous or a slowly varying data stream having a bandwidth of approximately 100 Kbit/sec, such as shown in FIG. 2. The streaming signal 23 thus exhibits the same transmission rate of 100 Kbit/sec. The digital broadcast receiver 15 necessarily operates in a constant powered-on mode in order to receive all the information provided by the streaming signal 23, which may also include one or more other data streams provided by one or more other information service providers (not shown).

With respect to signaling time-slice information, using absolute-clock-time information may be undesirable because, in digital broadband broadcasting systems, accurate enough clock information may not be available. Typical clock resolution is approximately one second.

There are proposals to add time-slice information into service information (SI) tables to indicate time-slice information. SI tables are used to carry control information such as tuning parameters, digital broadband broadcast service parameters, subtitling in digital television, and electronic-program-guide information. A problem with using SI tables to carry time-slice information is that SI tables are sent independently of time-slice bursts. This means that information can come during the idle time between two bursts. To reduce power consumption, though, the receiver should be able to be shut down, including being put into a reduced-power-consumption mode, during this idle time between transmission bursts.

Figure 3:
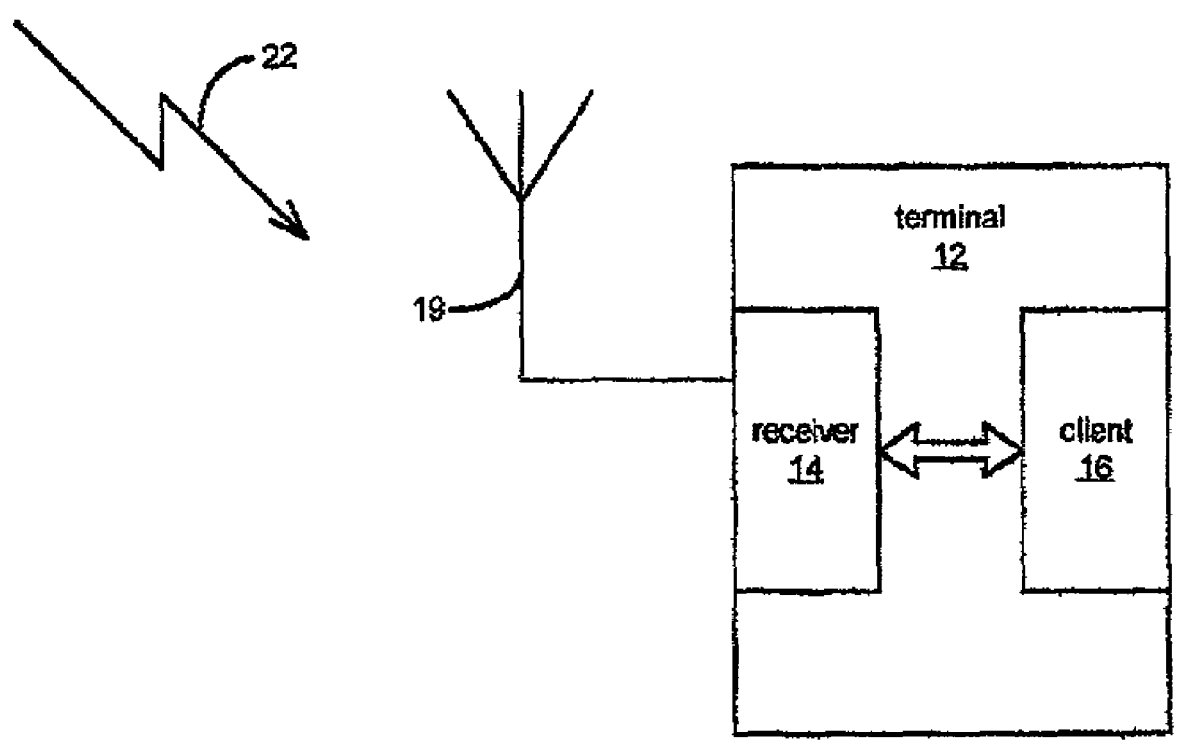
FIG. 3 shows a digital broadband broadcast terminal including a receiver and client.

Referring to FIG. 3, a terminal 12, which can be a mobile terminal, such as a cellular telephone, a personal digital assistant, a portable computer, and the like, includes a receiver 14, a client 16, and an antenna 19. A digital broadband broadcast signal 22 is also shown. In the receiver 14, a processor can perform part of the data path processing and can handle lower level protocols, such as layer 2 information, which can include digital video broadcasting digital storage media command and control (DVB DSM-CC) section protocol packets, service information (SI) tables, and multi protocol encapsulated (MPE) packets. Software running on the client 16 can handle layer 3 and higher layers including TCP/IP and application-specific layers. Passing time-slice information, which is specified in absolute—rather than relative—terms, between the processors of the receiver 14 and the client 16 typically introduces undesirable latency into the time-slice information due to potentially variable latency between the two processors.

The amount of time it takes to transfer data between processors may contribute to this type of undesirable latency. For example, when a first processor requests a data bus that is shared between the first processor and a second processor, the bus may be busy performing a different transfer. This type of situation can introduce a variable amount of latency before the first processor can acquire the data bus to perform the desired data transfer. In addition, software latency may be caused by software not reacting immediately to requests, such as a time-slice-reception interrupt. Delays in servicing interrupts can be caused by execution of non-interruptible software by the receiver 14 or the client 16 or by both the receiver 14 and the client 16.

There are also proposals to add time slice information into a higher layer protocol. A problem with these proposed solutions is that higher-level protocols are handled with higher-level software, which is typically run by the client 16. As discussed above, there is variable latency when transferring information between the receiver 14 and client 16. So, when transferring time-slice information from the client 16 to the receiver 14, maintaining accurate time information may not be possible.

Adding time slice information to packet headers and using time-slice information that specifies timing information in relative terms overcomes the various limitations of the proposals discussed above. The relative timing information can correspond to an amount of time between transmission bursts. For instance, for two bursts from a single information service provider, the first burst can carry in its packet headers information specifying how much later the receiver should expect to receive the second burst.

A transmitter-system component, such as a multi-protocol encapsulator, can encode time-slice information while forming packets to be transmitted in bursts. The encapsulator can add the time-slice information to packet headers. This time-slice information can specify in relative terms when the transmitter will send a next transmission burst for the same information service. As described in more detail below, the encapsulator can include an elastic buffer that stores data from one or more information service providers. Such an elastic buffer can be large enough to store at least two bursts worth of information from substantially all of the information services for which the transmitter is transmitting bursts of information. When the encapsulator has received at least two bursts worth of information from an information service provider and has received whatever data the transmitter will send between two such bursts, the encapsulator can determine how much time will elapse between transmission of the first burst and transmission of the second burst. This time information can be added to one or more of the packets of a transmission burst. In this manner, encapsulated packets can carry accurate information regarding how much time will elapse between receiving a current burst and receiving a subsequent burst. This information can be accurate, because an encapsulator, as described above, can determine how much data there is between a current packet and the start of a subsequent burst.

Figure 4:
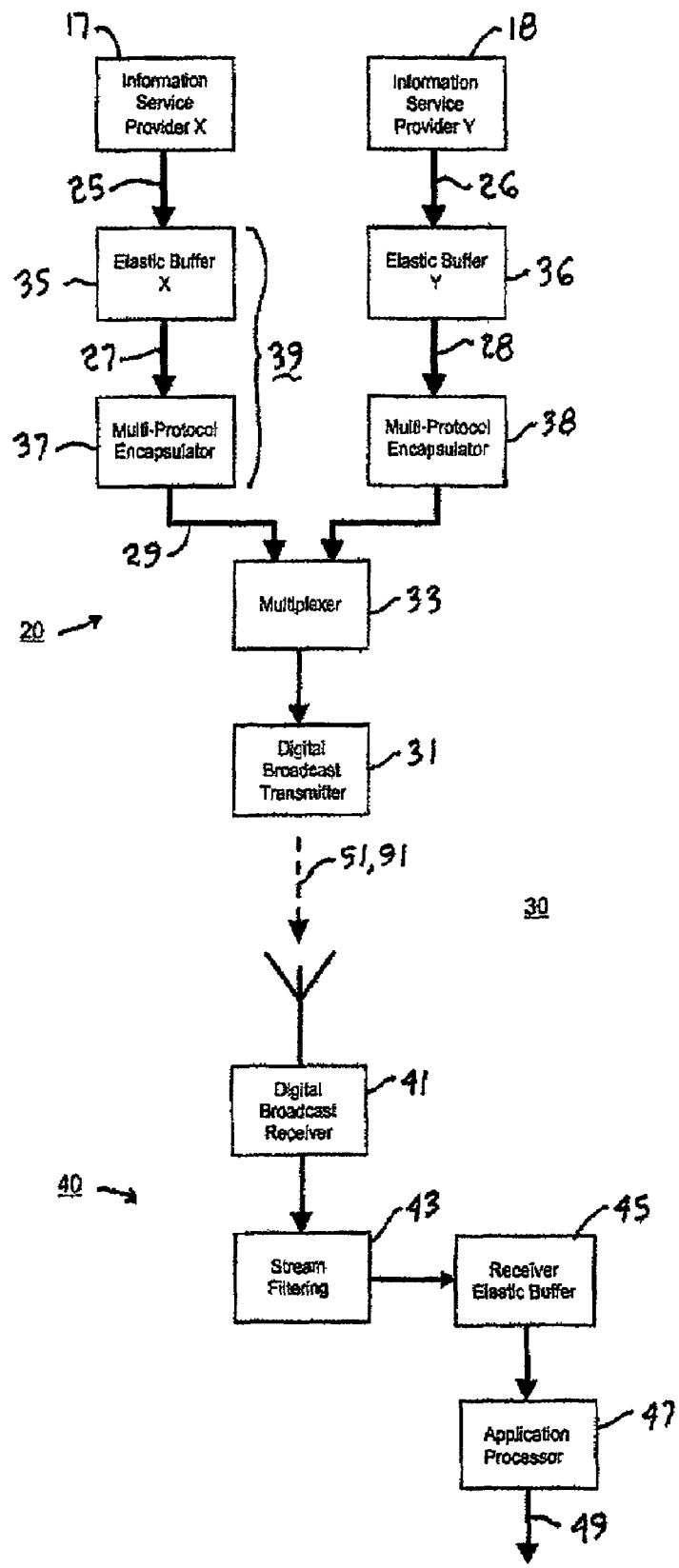
FIG. 4 shows a first preferred embodiment of a time-slicing digital broadcasting system in accordance with the invention.

FIG. 4 depicts an embodiment of a time-slicing digital broadcasting system 30, in which time-slice information can be signaled in accordance with the invention, including a transmitter system 20 and a receiver system 40. A first information stream originating at a first information service provider 17 in the transmitter system 20 is intended for downstream transmittal to a client using a digital broadcast receiver 41 in the receiver system 40. During operation of the transmitter system 20, a data signal 25 is received from the first information service provider 17 over a network link. A predetermined interval of the streaming information in the data signal 25 is initially buffered in a first elastic buffer 35 as a buffered information interval 27. As will be apparent, the first elastic buffer 35 may be replaced by any other suitable type of input buffer, including but not limited to, a first-in, first-out (FIFO) buffer, a ring buffer, or a dual buffer having separate input and output sections.

In a preferred embodiment, the buffered information interval 27 is then formatted by using, for example, a multi-protocol encapsulator 37 in accordance with Section 7 of European Standard EN 301192 "Digital Video Broadcasting (DVB); DVB specification for data broadcasting." The first elastic buffer 35 can be integrated with the multi-protocol encapsulator 37 to comprise a single device 39. After encapsulation, the multi-protocol encapsulator 37 sends an encapsulated information interval 29 to a digital broadcast transmitter 31 for broadcast to the digital broadcast receiver 41 as a time-slicing signal 51, as described in greater detail below.

Figure 5:
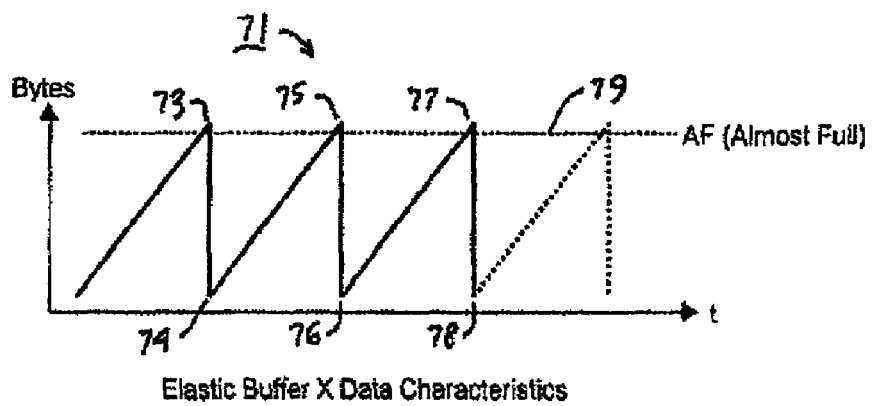
FIG. 5 is a graph showing changes over time in the contents of an elastic buffer in the broadcasting system of FIG. 4.

The amount of information inputted into the first elastic buffer 35 as a function of time can be represented by a sawtooth waveform 71 shown in the graph of FIG. 5. As the first service provider 17 supplies the data signal 25, the data information in the first elastic buffer 35 increases to a buffer maximum level, here denoted by a first local maximum value 73. The buffer maximum level is related to the amount of memory designated in the first elastic buffer 35 for storing the first information signal.

The size of the first elastic buffer 35 is generally specified to be at least as large as the information stream supplied by the service provider 17 in the time interval between successive waveform maxima (e.g., the first local maximum value 73 and a second local maximum value 75). The buffered information interval 27 of the first elastic buffer 35 is periodically sent via the multi-protocol encapsulator 37 to the digital broadcast transmitter 31 such that the specified memory capacity in the first elastic buffer 35 is not exceeded. When the buffered information interval 27 is sent to the digital broadcast transmitter 31, the quantity of buffered information remaining in the first elastic buffer 35 drops to a local minimum value 74, which can be zero.

The first elastic buffer 35 may include an 'AF' flag which can be set when an "almost full" byte count 79 is reached to indicate when the first elastic buffer 35 is about to exceed the designated memory capacity. Preferably, the process of outputting the buffered information interval 27 begins when the AF flag is set. This serves to provide storage capacity for a subsequent interval of the streaming information sent by the service provider 17 (here represented by the next part of the waveform 71). When the next streaming data information interval has been inputted, the buffered information in the first elastic buffer 35 reaches a second local maximum value 75 which is subsequently outputted when the AF flag is set, resulting in a second local minimum value 76. The process is repeated, yielding a third local maximum value 77 and a third local minimum value 78.

Figure 6:
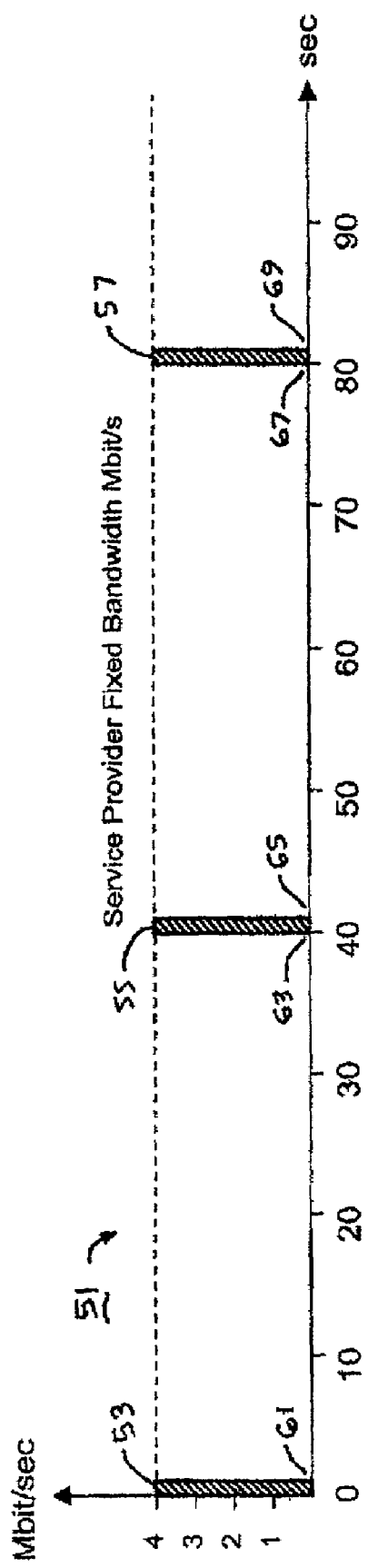
FIG. 6 shows the transmission rate of a signal output by a transmitter in the system of FIG. 4.

Each subsequent portion of the streaming data buffered in the first elastic buffer 35 is thus successively outputted to the digital broadcast transmitter 31 for transmission to the digital broadcast receiver 41. This action produces the time-slicing signal 51, a portion of which is shown in FIG. 6. The time-slicing signal 51 comprises a continuous series of transmission bursts, exemplified by transmission bursts 53, 55, and 57. In the example provided, the transmission burst 53 corresponds to the buffered information transfer represented by the transition of the waveform 71 from the local maximum value 73 to the local minimum value 74. Likewise, the next transmission burst 55 corresponds to the buffered information transfer represented by the transition of the waveform 71 from the local maximum value 75 to the local minimum value 76, and the transmission burst 57 corresponds to the buffered information transfer represented by the transition from the local maximum value 77 to the local minimum value 78.

In an illustrative embodiment of the invention, each of the transmission bursts 53, 55, and 57 is a 4-Mbit/sec pulse approximately one second in duration to provide a transfer of four Mbits of buffered information per transmission burst. The transmission bursts 53, 55, and 57 are spaced at approximately 40-second intervals such that the time-slicing signal 51 effectively broadcasts at an average signal information transmittal rate of 100 Kbits per second (i.e., the same as the transmittal rate of the incoming streaming signal 23). The 40-second signal segment stored in the elastic buffer 35 comprises the signal information to be broadcast to the digital broadcast receiver 41 as any one of the transmission bursts 53, 55, and 57, for example.

An example of encoding time-slice information is provided in the context of DVB multi protocol encapsulation (MPE) of digital video broadcasting (DVB) packets. FIG. 7 is a table that lists fields and their respective sizes for a data broadcast descriptor in accordance with EN 300468. Data_broadcast_id 80 is a 16-bit field that identifies the data broadcast specification that is used to broadcast the data in the broadcast network. Allocations of the value of this field are found in ETR 162. A Data_broadcast_id Value of 0x0005 is reserved for multi protocol encapsulation.

The size of a DVB MPE packet header is fixed. This type of packet header includes media access control (MAC) address bytes. FIG. 8 is a table that depicts syntax of a datagram_section in accordance with EN301192. MAC_address_1 90-1 through MAC_address_6 90-6 are six bytes—some or all of—which are conventionally used for MAC addressing of various network components.

FIG. 9 is a table that shows the syntax of a multiprotocol_encapsulation_info structure in accordance with EN 301192. A descriptor defines how many of the MAC address bytes are valid for MAC addressing. MAC_address_range 92 is a 3-bit field that indicates the number of MAC address bytes that are used for differentiating multicast services.

FIG. 10 shows the coding of the MAC_address_range field 92 of FIG. 9 in accordance with EN301192. FIG. 10 shows which MAC address bytes are valid for MAC addressing based on various MAC_address_range values. For a given value of MAC-address range 92, the remaining MAC addressing bytes remain unused. For instance, for a MAC-address range value of 0x01, MAC-address bytes 1 through 5 remain unused. For a MAC-address range value of 0x02, MAC-address bytes 1 through 4 remain unused and so on.

In FIG. 9, there is a 3-bit field 96 marked as reserved. This reserved field 96 can be used to define different meanings for MAC address bits being used to signal time-slice information. For instance, one or more of these 3 reserved bits can be used to specify how bytes that are reserved, but not used, for MAC addressing are being used for time-slice information.

Time-slice information can include the length of a burst, an amount of time between original bursts, the time between an original burst and a copy of the burst, and numbering of original bursts. This type of time-slice information can be placed into packet headers, for instance in the MAC address bytes 90-1 through 90-6 discussed above. Various combinations and permutations of this type of time-slice information can be placed into the packet headers. For example, the length of a burst and the amount of time between original bursts can be used without other time-slice information. Examples of time-slice information are discussed below in more detail in connection with FIGS. 17–29.

Figure 11:
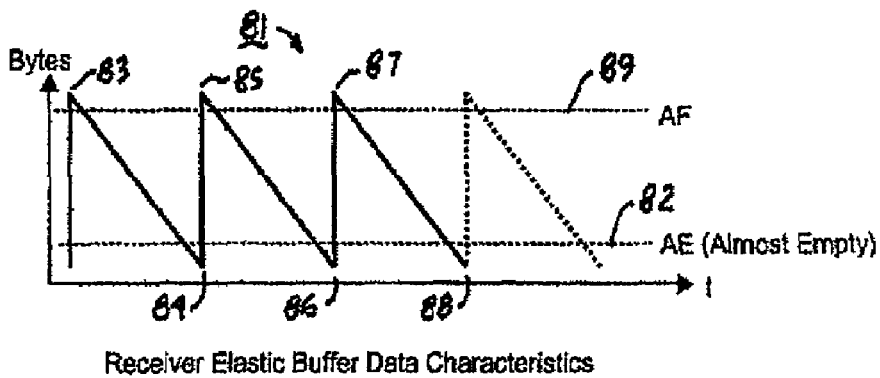
FIG. 11 is a graph showing changes over time in the contents of a receiver elastic buffer in the broadcasting system of FIG. 4.

Referring again to FIG. 4, the digital broadcast receiver 41 sends the time-slicing signal 51 to a stream filtering unit 43 to strip the encapsulation from the information signal which had been added by the multi-protocol encapsulator 37. The encapsulation may carry Internet Protocol (IP) packets, for example. In a preferred embodiment, Boolean protocol filtering is used to minimize the amount of logic needed for filtering operations performed by the stream filtering unit 43, and thus optimize the capacity of the digital broadcast receiver 41. A filtered information interval is then sent to a receiver elastic buffer 45 which functions to temporarily store the information signal comprising any one of the transmission bursts 53, 55, and 57 before being sent downstream to an application processor 47 for conversion into an information data stream 49. This action can be illustrated with reference to the graph of FIG. 11 in which sawtooth waveform 81 diagrammatically represents as a function of time the quantity of information signal stored in the receiver elastic buffer 45. In a preferred embodiment, the size of the receiver elastic buffer 45 in the receiver system 40 is substantially the same as the size of the first elastic buffer 35 in the transmitter system 20.

When the transmission burst 53 has been received in the receiver elastic buffer 45, the waveform 81 reaches a first local maximum 83. The byte count stored in the receiver elastic buffer 45 then decreases from the first local maximum 83 to a first local minimum 84 as corresponding information is transferred from the receiver elastic buffer 45 to the application processor 47. Preferably, the rate at which the contents of the receiver elastic buffer 45 is transferred to the application processor 47 is at least as great as the rate at which data information is placed into the first elastic buffer 35. This serves to insure that the receiver elastic buffer 45 is available to store the next transmission burst 55. When the next transmission burst 55 is received at the receiver elastic buffer 45, the waveform 81 increases to a second local maximum 85 which decreases to a second local minimum 86 as the received information interval is transferred from the receiver elastic buffer 45 to the application processor 47 for conversion to a data packet.

The process continues with the next transmission burst 57 producing a third local maximum 87 which decreases to a third local minimum 88. Preferably, the receiver elastic buffer 45 includes an 'AE' flag to indicate when an "almost empty" byte count 82 has been reached and an AF flag to indicate when an "almost full" byte count 89 has been reached. As explained in greater detail below, the AE and AF flags can be advantageously utilized to synchronize the powering up and the powering down respectively of the digital broadcast receiver 41 with the timing of incoming transmission bursts, such as the transmission bursts 53, 55, and 57.

The data packets thus being converted from the received information intervals in the receiver elastic buffer 45 are continuously reformatted into the information transmission stream 49 by the application processor 47 which functions to continuously input data from the receiver elastic buffer 45. As can be appreciated by one skilled in the relevant art, while the digital broadcast transmitter 31 remains powered-up in a transmission mode during each transmission burst 53, 55, and 57, the digital broadcast transmitter 31 can be advantageously powered down in the 'idle' time intervals between the transmission bursts 53 and 55, and between the transmission bursts 55 and 57 to reduce operational power requirements. Powering down can be accomplished, for example, by a controlled switch as is well-known in the relevant art.

In particular, the digital broadcast transmitter 31 can be powered down after termination point 61 of transmission burst 53 (shown at t=1 sec), and can remain powered-down until just before initiation point 63 of transmission burst 55 (shown at t=40 sec). Similarly, the digital broadcast transmitter 31 can power down after termination point 65 of transmission burst 55 (shown at t=41 sec), and can remain powered-down until just before initiation point 67 of transmission burst 57 (shown at t=80 sec). At the completion of the transmission burst 57, indicated as termination point 69 (shown at t=81 sec), the digital broadcast transmitter 31 can again be powered down.

Decoding of time-slice information can be done in the application processor 47. Upon receiving a burst of packets, stream filtering unit 43 filters (at least) one time slice and stores the filtered time slice's information to receiver elastic buffer 45. The stream filtering unit 43 notifies the application processor 47 that a new time slice has been received. The application processor 47 can then decode the time-slice information and start other processing as appropriate.

An information service provider sets the MAC_IP_mapping_flag 1-bit flag 94 (FIG. 9) to '1' if the service uses the IP to MAC mapping as described in IETF RFC 1112. If this flag is set to '0', the mapping of IP address to MAC address is done outside the scope of the EN 301192.

When receiving IP multicast services, the MAC address is generated from the IP address carried inside the data_gram section. So, IP address information is copied to the MAC address bits 90–1 through 90-6. The receiver, therefore, can perform address filtering also by using an IP address, and in that case all of the MAC address bits can be available for carrying time-slice information of for any other purpose.

In an illustrative embodiment of the invention, the time-slicing digital broadcasting system 30 includes one or more additional service providers, exemplified by a second service provider 18, shown in FIG. 4. The second service provider 18 sends a second data signal 26 to the digital broadcast transmitter 31 over a network link. The second data signal 26 received from the second service provider 18 is placed into a second elastic buffer 36 and likewise encapsulated using, for example, a multi-protocol encapsulator 38. A multiplexer 33 processes the encapsulated signals from the first elastic buffer 35 and the second elastic buffer 36 into a time-division multiplexed (TDM) signal 91, described in greater detail below, for broadcast to the digital broadcast receiver 41.

It should be understood that if only one service provider is sending information to the digital broadcast transmitter 31, the first service provider 17 for example, the multiplexer 33 is not required for operation of the time-slicing digital broadcasting system 30. Accordingly, in the first preferred embodiment, above, the signal in the first elastic buffer 35 can be provided directly to the digital broadcast transmitter 31 via the multi-protocol encapsulator 37.

Figure 12:
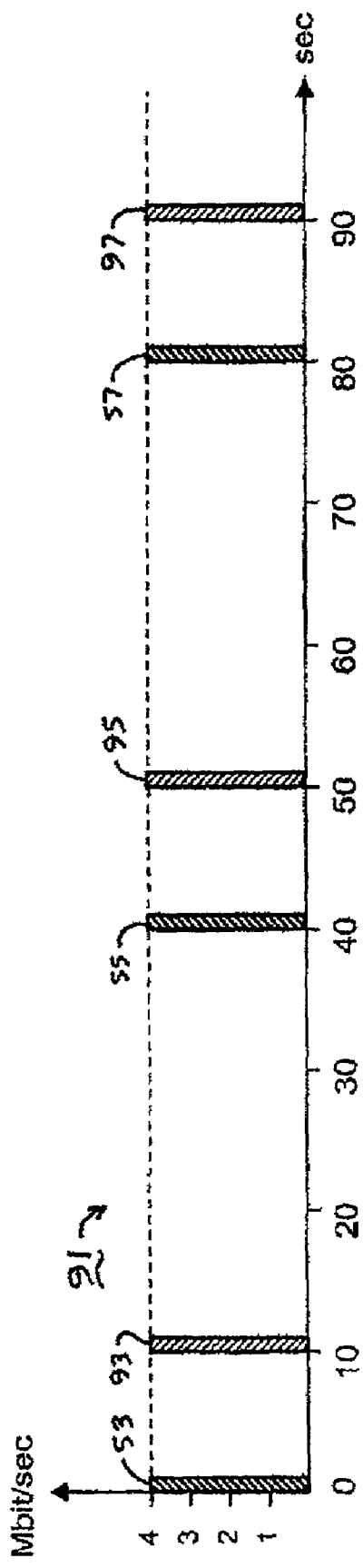
FIG. 12 shows the transmission rate of a time-division multiplexed signal output by a transmitter in the system of FIG. 4.

For the embodiment shown in FIG. 4, in which two service providers are supplying information signals, the TDM signal 91, shown in FIG. 12, comprises a continuous series of transmission bursts, including transmission bursts 53, 55, and 57 resulting from information signals provided by the first elastic buffer 35, interlaced with transmission bursts 93, 95, and 97 resulting from information signals provided by the second elastic buffer 36. In the example provided, each of the transmission bursts 93, 95, and 97 occurs approximately 10 seconds after a corresponding transmission burst 53, 55, or 57. As can be appreciated by one skilled in the relevant art, the disclosed method is not limited to this 10-second spacing and other temporal spacing values can be used as desired. Moreover, if additional service providers are included in the time-slicing digital broadcasting system 30, one or more sets of interlaced transmission bursts (not shown) will be included in the TDM signal 91.

In an illustrative embodiment of the invention, the powered-up receive mode of the digital broadcast receiver 41, in FIG. 4, is synchronized with a transmission window during which period the digital broadcast transmitter 31 is transmitting. Thus, for receipt of the time-slicing signal 51, for example, the digital broadcast receiver 41 remains powered-up in a receive mode during each incoming transmission burst 53, 55, and 57 and can be powered down in the time intervals between the transmission bursts 53 and 55, and between the transmission bursts 55 and 57.

By way of example, such synchronization can be achieved by using burst sizes of either fixed or programmable size, and by using the AE flag and "almost empty" byte count 82, above, as a criterion to power up the digital broadcast receiver 41 and prepare to receive the next transmission burst after fixed or slowly-varying time intervals. That is, the digital broadcast receiver 41 acquires information intermittently broadcast as described above. The client may also configure the digital broadcast video receiver 41 to take into account any transmission delays resulting from, for example, a bit rate adaptation time, a receiver switch-on time, a receiver acquisition time, and/or a bit-rate variation time interval. A typical value for the adaptation time may be about 10 μsec, and for the switch-on times or acquisition times a typical value may be about 200 msec. The digital broadcast receiver 41 is thus configured to power-up sufficiently in advance of an incoming burst to accommodate the applicable delay factors. Similarly, the AF flag and the "almost full" byte count 89, above, can be used as a criterion to power-up the digital broadcast receiver 41.

Figure 14:
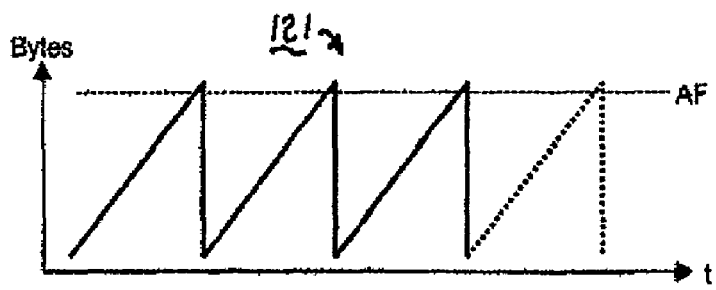
FIG. 14 is a graph showing changes over time in the contents of an elastic buffer in the broadcasting system of FIG. 13.
Figure 13:
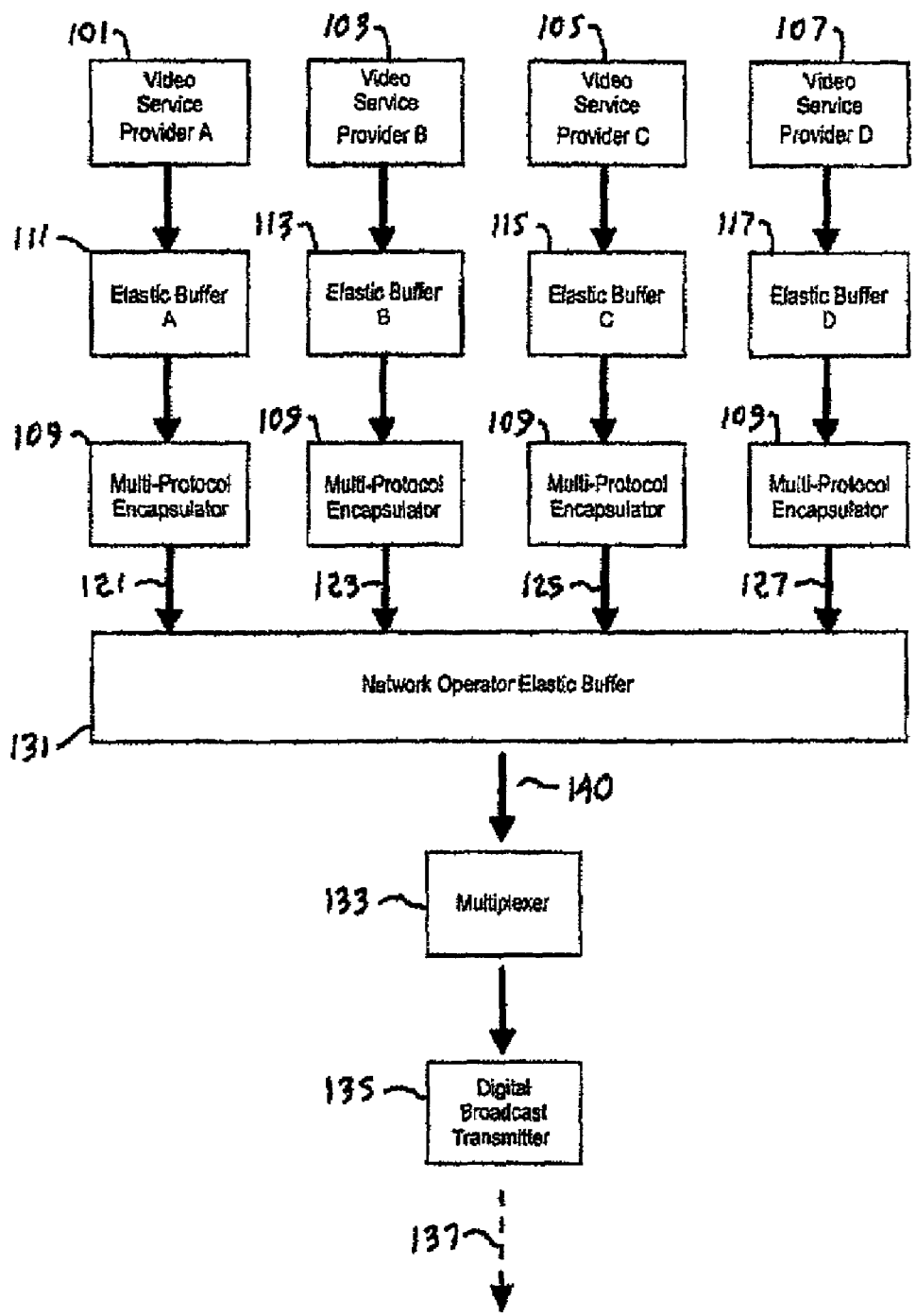
FIG. 13 shows an alternative preferred embodiment of a time-slicing digital broadcasting system.

In an illustrative embodiment of the invention, a TDM digital broadcasting system 100 is shown in FIG. 13 including a plurality of service providers 101–107 sending respective information streams to corresponding elastic buffers 111–117. The outputs of each of the elastic buffers 111–117 are formatted by means of a plurality of multi-protocol encapsulators 109 as described above. The respective outputs 121–127 of the multi-protocol encapsulators 109 are provided to a network operator elastic buffer 131 as shown. The size of the information interval stored in any of the elastic buffers 111–117 is a function of time, as represented by sawtooth waveform 121 in FIG. 14.

Figure 15:
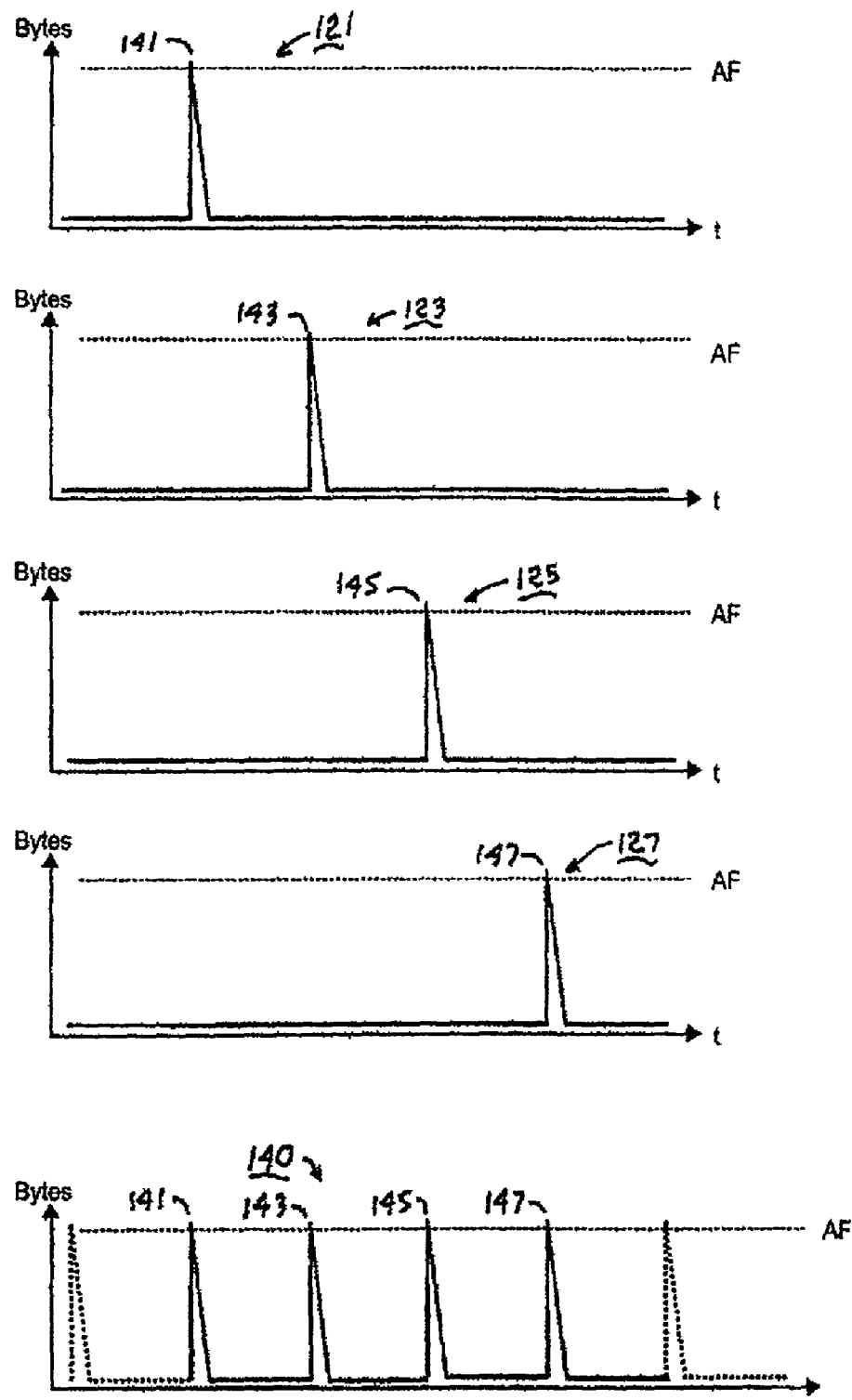
FIG. 15 is a graph showing changes over time in the outputs of the elastic buffers and in the contents of a network operator elastic buffer in the system of FIG. 13.

The network operator elastic buffer 131 stores a predetermined amount of buffered information from each of the elastic buffers 111–117. The information is provided to a multiplexer 133 and sent to a digital broadcast transmitter 135 for broadcast as a TDM signal 137. The network operator elastic buffer 131 functions to receive and store multiple inputs from each of the elastic buffers 111–117 before outputting to the multiplexer 133. In way of example, the waveform 140 in FIG. 15 represents the buffered information as a function of time in the elastic buffers 111–117. The input 121 received from the elastic buffer 111 is represented at local peak value 141 of the waveform 140, the input 123 received from the elastic buffer 113 is represented at the local peak value 143, the input 125 received from the elastic buffer 115 is represented at the local peak value 145, and the input 127 received from the elastic buffer 117 is represented at the local peak value 147.

Figure 16:
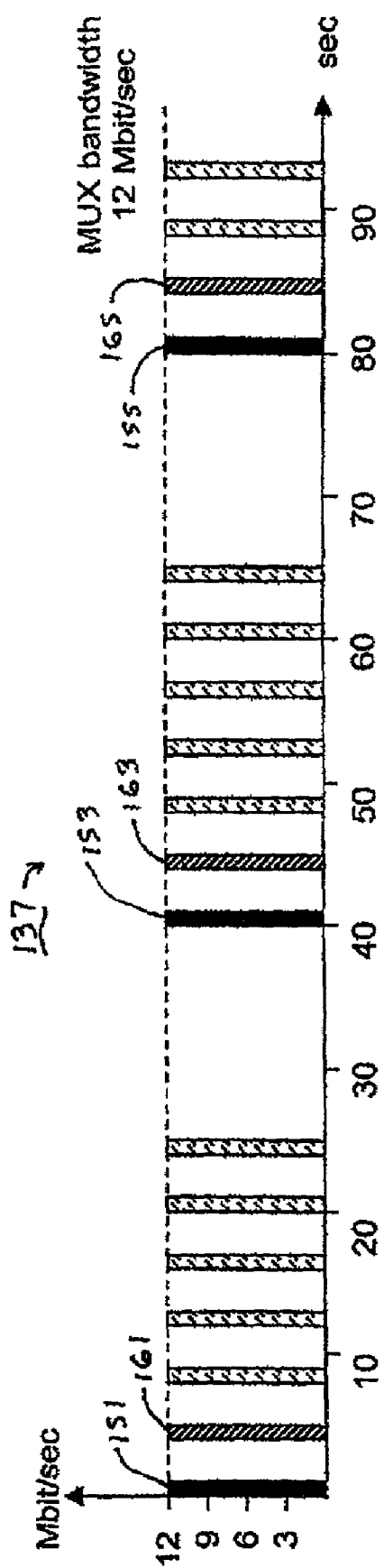
FIG. 16 shows the transmission rate of a time-division multiplexed signal output by a transmitter in the system of FIG. 13.

The resulting TDM signal 137 broadcast by the digital broadcast transmitter 135 is shown in FIG. 16 where the information stream provided by the service provider 101 appears as transmission bursts 151, 153, and 155 (here shown with solid fill for clarity). In a preferred embodiment, the multiplexer bandwidth is approximately 12 Mbit/sec, and transmission bursts 151, 153, and 155 are correspondingly 12-Mbit/sec bursts of approximately one second duration. The transmission burst 151, for example, may comprises three 4-Mbit/sec transmission bursts provided to the network operator elastic buffer 131 by the elastic buffer 111. A subsequent 12-Mbit/sec transmission burst 161 may comprise three 4-Mbit/sec transmission bursts provided to the network operator elastic buffer 131 by the elastic buffer 113.

In an illustrative embodiment of the invention, the transmission bursts originating with a particular service provider may comprise a unique data stream. For example, the transmission bursts 151, 153, and 155 comprise a first data stream, originating at the service provider 17, where the data stream has a burst-on time of about 333 msec and a burst-off time of about 39.667 sec. The first data stream comprises subsequent transmission bursts occurring precisely every forty seconds (not shown), each transmission burst including information originating at the service provider 17. Similarly, the transmission burst 161 comprises a second data stream along with transmission bursts 163, 165, and subsequent transmission bursts (not shown) occurring every forty seconds, where the second data stream includes information originating at the service provider 19. In one alternative embodiment, the digital broadcast receiver 41 is synchronized to selectively receive only the first data stream, for example. Accordingly, in this embodiment the digital broadcast receiver 41 is powered-up for at least 333 msec every forty seconds to receive the transmission bursts 151, 153, 155, and subsequent first-data-stream transmission bursts, and powered down in the interval time periods.

Figure 17:
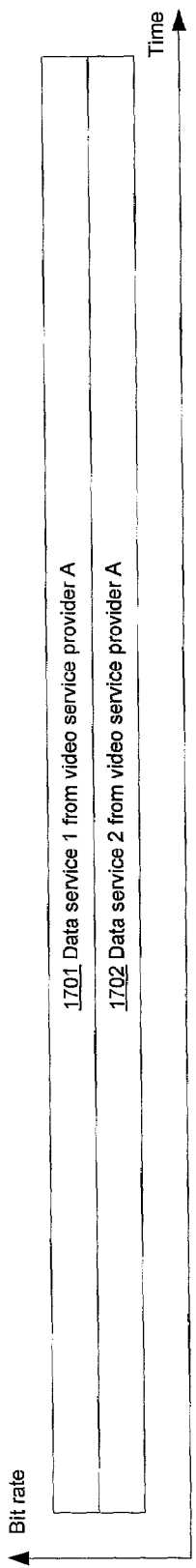
FIG. 17 is a graph of bit rate against time for data of a first data service and of a second data service of a video service provider.

Returning now to the example, which was discussed above in connection with FIGS. 7–10, of encoding time-slice information in the context of DVB multi protocol encapsulation (MPE) of digital video broadcasting (DVB)

packets, an example of data signals from various transmitter system components is provided in connection with FIGS. 17–21, wherein video service provider A 101 includes a first data service and a second data service, and video service provider B 103 includes a third data service and a fourth data service. FIG. 17 is a graph of bit rate against time for data of a first data service and of a second data service of video service provider A 101 of FIG. 13. The bit rate of the output signal of service provider A 101 comprises the bit rate 1701 of a first data service plus the bit rate 1702 of a second data service.

Figure 18:
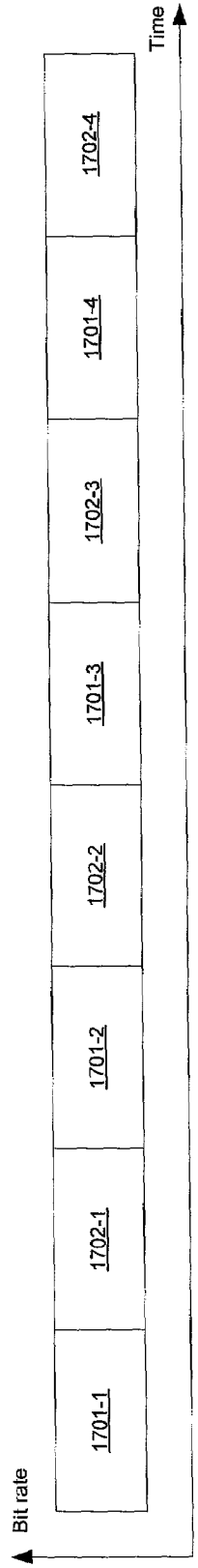
FIG. 18 is a graph of bit rate against time for output of elastic buffer A of FIG. 13.

FIG. 18 is a graph of bit rate against time for output of elastic buffer A 111 of FIG. 13. The portions of the signal labeled 1701-1, 1701-2, 1701-3, and 1701-4 correspond to data from data service 1 of video service provider A 101. The portions of the signal labeled 1702-1, 1702-2, 1702-3, and 1702-4 correspond to data from data service 2 of video service provider A 101.

Figure 19:
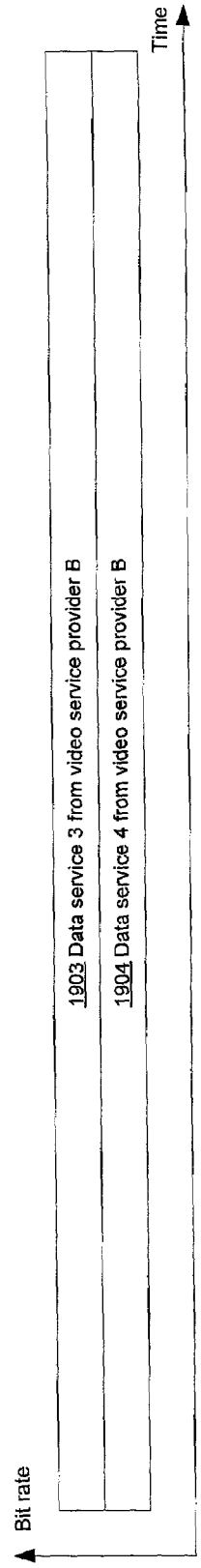
FIG. 19 is similar to FIG. 17 and is a graph of bit rate against time for data of a third data service and of a fourth data service from video service provider B of FIG. 13.

FIG. 19 is similar to FIG. 17. FIG. 19 is a graph of bit rate against time for data of a third data service and of a fourth data service from video service provider B 103 of FIG. 13. The bit rate of the output signal of service provider B 103 comprises the bit rate 1903 of the third data service plus the bit rate 1904 of the fourth data service.

Figure 20:
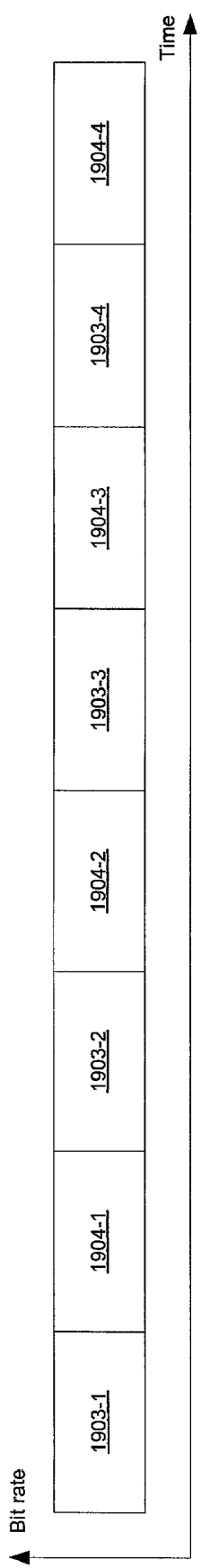
FIG. 20 is similar to FIG. 18 and is a graph of bit rate against time for output of elastic buffer B of FIG. 13.

FIG. 20 is similar to FIG. 18. FIG. 20 is a graph of bit rate against time for output of elastic buffer B 113 of FIG. 13. The portions of the signal labeled 1903-1, 1903-2, 1903-3, and 1903-4 correspond to data from data service 3 of video service provider B 103. The portions of the signal labeled 1904-1, 1904-2, 1904-3, and 1904-4 correspond to data from data service 4 of video service provider B 103.

Figure 21:
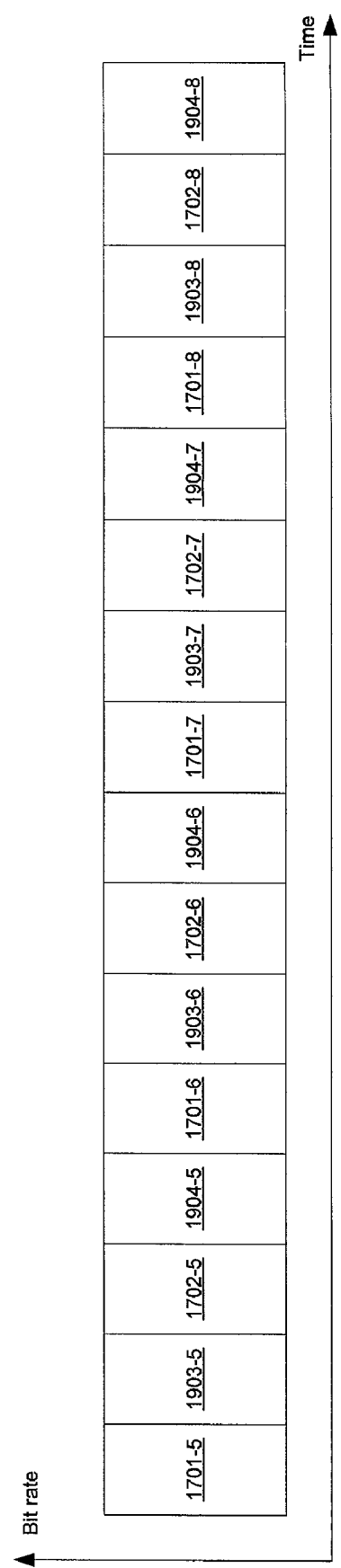
FIG. 21 is similar to FIGS. 18 and 20 and is a graph of bit rate against time for the output signal from the network operator elastic buffer of FIG. 13.

FIG. 21 is similar to FIGS. 18 and 20. FIG. 21 is a graph of bit rate against time for output signal 140 from network operator elastic buffer 131 of FIG. 13. The portions of the signal labeled 1701-5, 1701-6, 1701-7, and 1701-8 correspond to data from data service 1 of video service provider A 101. In accordance with an embodiment of the invention, the bit rate for these portions of the signal 140 is higher and the duration of each of these portions of the signal 140 is shorter than the corresponding portions 1702-1, 1702-2, 1702-3, and 1702-4 of the signal from data service 1. Similarly, the portions of the signal labeled 1903-5, 1903-6, 1903-7, and 1903-8 correspond to data from data service 3 of video service provider B 103. In this manner, the portions of the data signal 140 shown in FIG. 21 contains data from data services 1, 3, 2, and 4 in a repeating pattern.

As discussed above, time-slice information can include the length of a burst, an amount of time between original bursts, the time between an original burst and a copy of the burst, and numbering of original bursts. FIG. 22 shows a packet 2200 including a packet payload 2220 and a set of time slicing parameters 2202-2218 that can be used in various permutations and combinations for signaling time-slice information, as described in more detail below. As will be apparent, time-slice information can be signaled using reserved unused bits of any suitable protocol, including, but not limited to, digital video broadcasting digital storage media command and control (DVB DSM-CC) section protocol.

Packet index 2202 can be used for numbering packets within a time slice or burst of packets. FIG. 23 shows down numbering from 4 to 0 of packets 2200-1 through 2200-5 within a time slice 2300 comprising 5 packets 2200. Numbering packets down to a predetermined value such as 1 or 0 can be used to signal the end of a burst of packets. Similarly packets 2200 can be numbered in ascending order from a predetermined first value to signal the beginning of a burst of packets.

A time-slice-boundary indication 2204 can be used for signaling a first packet of a burst of packets or a last packet of a burst of packets. FIG. 24 shows a value of 1 for time-slice-boundary indication 2204-1 of packet 2200-1 to indicate that this packet is the first packet of the time-slice or burst of packets 2400. Similarly, time-slice-boundary indication 2204-5 of packet 2200-5 could have a different value, for than packets 2200-1 through 2200-4 to indicate that packet 2200-5 is the last packet of the burst of packets 2400. The time slice-boundary indication can be a single bit, in which case it can be used to signal either the first packet or the last packet of a burst of packets. By using a 2-bit time-slice-boundary 2204, both the first and last packets of a burst of packets can be identified.

When used as an indication of the first packet of a burst of packets, the time-slice-boundary indication 2204 can be combined with the packet index 2202 in the down-counting mode to dynamically define the number of packets in a burst of packets. Combining the time-slice-boundary indication 2204 with the packet index 2202 in the down-counting mode provides a robust way of signaling the beginning of variable-length bursts of packets having less than or equal to a predetermined maximum number of packets. Similarly, when used as an indication of the last packet of a burst of packets, the time-slice-boundary indication 2204 can be combined with the packet index 2202 in the up-counting mode to dynamically signal the end or last packet of variable-sized bursts of packets.

Bursts of packets can be transmitted more than once. This can be useful for error-detection and/or error-correction purposes. An original burst of packets refers to a first transmission of a burst of packets. A copy burst refers to a re-transmission of an original burst. A receiver 14 can use packet indexes 2202, when one or more copies of bursts are being transmitted, for uniquely identifying packets 2200 to determine whether a particular original packet has already been correctly received.

FIG. 25 shows next burst indications 2206-1 through 2206-5 for which a value of 0 indicates that the next burst of packets for a particular data service will be a copy of a previously transmitted burst. Next burst indications 2206-1, 2206-2, and 2206-4 have a value of 0, which indicate that bursts 2500-2, 2500-3, and 2500-5 will be copies of previously transmitted bursts. A value of 1 indicates that the next burst to be transmitted will be an original burst. For example, next burst indication 2206-3 has a value of 1, which indicates that the next burst 2500-4 will be an original burst.

Figure 26:
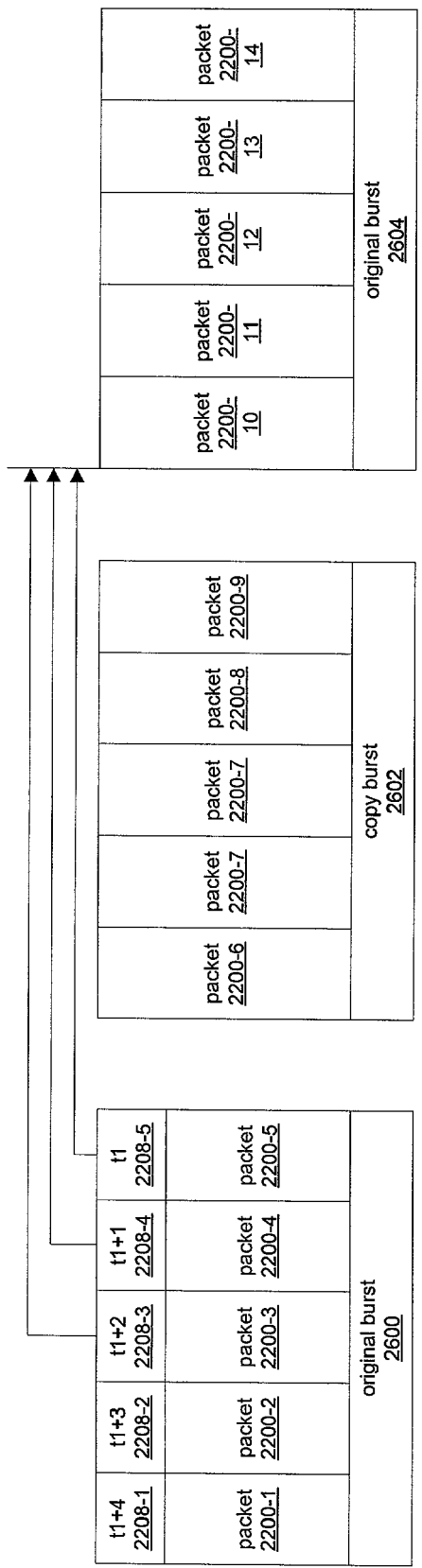
FIG. 26 shows signaling of an amount of time between transmission of a current packet and the first packet of the next original burst.

A value for the time to next original time-slice parameter 2208 can be used to specify an amount of time between transmission of a current packet and the first-transmitted packet of the next transmitted original burst of packets from the same data service of the same information service provider from which the current packet came. As used herein, transmission may refer to a broadcast, multicast, or unicast, and data can include, but is not limited to, IP protocol-encoded data. FIG. 26 shows first and second original bursts 2600 and 2604 of packets 2200. The value t1 of time to next original 2208-5 represents an amount of time between transmission of packet 2200-5, also referred to as the current packet, and packet 2200-10, which is the first packet of the next original burst 2604 from the data service and information service provider of the current packet. Twelve bits can be used to specify this type of information with a resolution of approximately 10 milliseconds. Similarly, value t1+1 2208-4 indicates an amount of time between transmitting packet 22004 and packet 2200-10, and value t1+2 2208-3 indicates an amount of time between transmitting packet 2200-3 and packet 2200-10.

If the receiver 14 receives an original burst of packets with errors, the receiver can then power itself up to receive any copy bursts corresponding to the correctly received original burst. If the receiver 14 receives an original burst of packets without errors, the receiver can then ignore any copy bursts corresponding to the correctly received original burst. Ignoring copy bursts in this manner can include keeping the receiver powered down during one or more time periods during which copy bursts to be ignored could otherwise be received.

Figure 27:
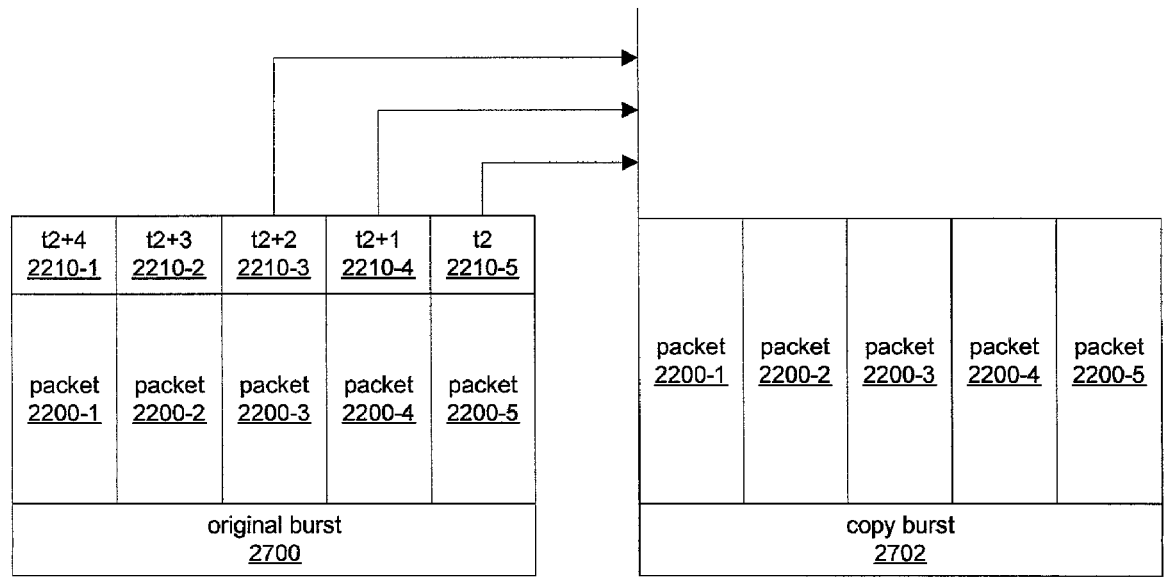
FIG. 27 shows signaling of an amount of time between transmission of a current packet and the first packet of the next copy burst.

A value for the time to next copy parameter 2210 can be used to specify an amount of time between transmission of a current packet and the first packet of the next transmitted copy burst of the current burst of packets from the same data service of the same information service provider. FIG. 27 shows an original burst 2700 and a copy burst 2702 of packets 2200. The value t2 of time to next copy 2210-5 represents an amount of time between transmission of packet 2200-5, also referred to as the current packet, of original burst 2700 and packet 2200-1 of copy burst 2702, which is the first packet of the next copy burst from the data service and information service provider of the current packet. Twelve bits can be used to specify this type of information with a resolution of approximately 10 milliseconds. Similarly, value t2+1 2210-4 indicates an amount of time between transmitting packet 2200-4 of original burst 2700 and packet 2200-1 of copy burst 2702, and value t2+2 2210-3 indicates an amount of time between transmitting packet 2200-3 of original burst 2700 and packet 2200-1 of copy burst 2702.

As discussed above in connection with the discussion of time to next original 2208, if the receiver 14 receives an original burst of packets with errors, the receiver can then power itself up to receive any copy bursts corresponding to the correctly received original burst. If the receiver 14 receives an original burst of packets without errors, the receiver can then ignore any copy bursts corresponding to the correctly received original burst.

Figure 28:
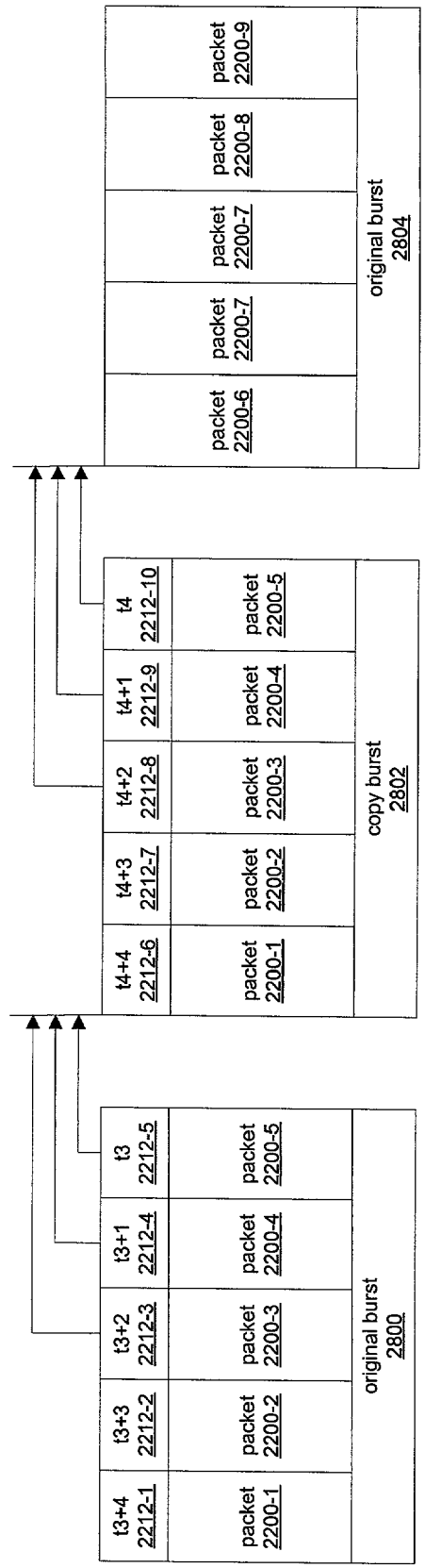
FIG. 28 shows signaling of an amount of time between transmission of a current packet and the first packet of the next burst.

A value for the time to next burst time-slice parameter 2212 can be used to specify an amount of time between transmission of a current packet and the first packet of the next transmitted burst of packets—regardless of whether the next burst is an original burst or a copy burst—from the same data service of the same information service provider. FIG. 28 shows an original burst 2800 and a copy burst 2802 of packets 2200. The value t3 of time to next burst 2212-5 represents an amount of time between transmission of packet 2200-5, also referred to as the current packet, of original burst 2800 and packet 2200-1 of copy burst 2802, which is the first packet of the next copy burst from the data service and information service provider of the current packet. Twelve bits can be used to specify this type of information with a resolution of approximately 10 milliseconds. Similarly, value t3+1 2212-4 indicates an amount of time between transmitting packet 2200-4 of original burst 2800 and packet 2200-1 of copy burst 2802, and value t3+2 2212-3 indicates an amount of time between transmitting packet 2200-3 of original burst 2800 and packet 2200-1 of copy burst 2802. Similarly, the value t4 of time to next burst 2212-10 represents an amount of time between transmission of packet 2200-5, also referred to as the current packet, of copy burst 2802 and packet 2200-6 of original burst 2804, which is the first packet of the next original burst 2804 from the data service and information service provider of the current packet. Similarly, value t4+1 2212-9 indicates an amount of time between transmitting packet 2200-4 of copy burst 2802 and packet 2200-6 of original burst 2804, and value t4+2 2212-8 indicates an amount of time between transmitting packet 2200-3 of copy burst 2802 and packet 2200-6 of original burst 2804.

As discussed above in connection with the discussion of time to next original 2208 and time to next copy 2210, if the receiver 14 receives an original burst of packets with errors, the receiver can then power itself up to receive any copy bursts corresponding to the correctly received original burst. Based on time to next burst 2212, however, even if the receiver 14 receives an original burst of packets without errors, the receiver may need to be powered up for a copy regardless of having correctly received the original burst.

Figure 29:
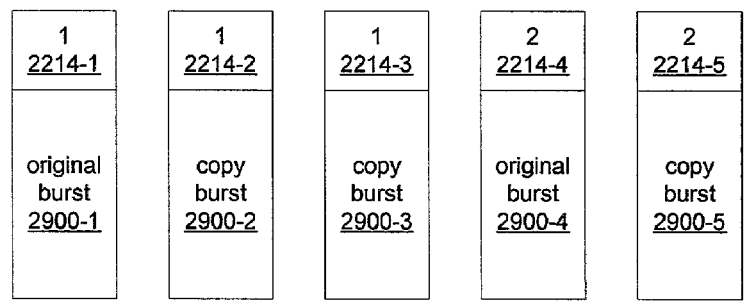
FIG. 29 shows numbering of original and copy bursts.

Bursts of packets can be indexed with a time slice index 2214 such that original bursts are uniquely indexed and copy bursts have the same indexes as their corresponding original bursts. FIG. 29 shows two original bursts 2900-1 and 2900-4, which have values of 1 and 2 for time slice indexes 2214-1 and 2214-4. Copy bursts 2900-2 and 2900-3 are copies of original burst 2900-1. These copy bursts 2900-2 and 2900-3 therefore have the same value of 1 for their respective time slice indexes 2214-2 and 2214-3. Similarly, copy burst 2900-5, which is a copy of original burst 2900-4, has the same time slice index value of 2 as original burst 2900-4.

A time-slice-duration parameter 2216 can be used to indicate how long transmission of a current burst of packets takes. A receiver 14 can set a timer to shut the receiver off after an amount of time corresponding to the time slice duration 2216 elapses from the beginning of reception of a burst of packets. Time slice duration 2216 can be specified as a 4-bit value in increments of 100 milliseconds. The receiver 14 can also shut the receiver off a predetermined amount of time after the beginning of reception of a packet.

A maximum transmission unit (MTU) size parameter 2218 can be used to optimize receiver memory usage. Values such as 1024, 2048, and 4096 kilobytes, as well as other suitable values, can be used for this parameter.

As mentioned above, various permutations and combinations of the time-slice parameters 2202–2218 can be used for signaling time-slice information. For instance, an 8-bit packet index 2202 in down-counting mode, a 1-bit next burst indication 2206 that indicates whether the next burst is an original burst or a copy burst, a 1-bit time-slice boundary indication 2204 that indicates the beginning of a time slice, a 12-bit time to next burst 2212 having a resolution of 10 milliseconds, and a 4-bit time-slice duration having a resolution of 100 milliseconds can be used together to signal time-slice information. If the remaining time-slice parameters are not used, signaling time-slice information this way uses 26 bits. If MPE packet header bytes reserved, but unused, for MAC addressing are used for signaling time-slice information with the time-slice parameters discussed in this paragraph, 2 MAC addressing bytes would remain available for MAC addressing.

Alternatively, an 8-bit packet index 2202 in down-counting mode, a 1-bit next burst indication 2206 that indicates whether the next burst is an original burst or a copy burst, a 1-bit time-slice boundary indication 2204 that indicates the beginning of a time slice, a 12-bit time to next original 2208 having a resolution of 10 milliseconds, a 12-bit time to next copy 2210 having a resolution of 10 milliseconds, and a 4-bit time-slice duration having a resolution of 100 milliseconds can be used together to signal time-slice information. If the remaining time-slice parameters are not used, signaling time-slice information in this manner uses 38 bits. If MPE packet header bytes reserved, but unused, for MAC addressing are used for signaling time-slice information with the time-slice parameters discussed in this paragraph, 1 MAC addressing byte would remain available for MAC addressing.

While the invention has been described with reference to particular embodiments, it will be understood that the invention is by no means limited to the particular constructions and methods herein disclosed and/or shown in the drawings, but also comprises any modifications or equivalents within the scope of the claims.

I claim:

1. A time-slicing digital broadcasting transmitter system comprising:
   a buffer that receives at least one of digital video content and digital audio content from an information service provider;
   an encapsulator that receives the buffered content from the buffer and that forms at least one packet header for a current packet of a current burst of packets, wherein the current packet contains a first portion of the buffered content, wherein the at least, one packet header contains time-slice information that includes a time-slice parameter specifying a relationship between the curent packet of the current burst of packets and a subsequent burst of packets that contains a second portion of the buffered content; and
   a digital video broadcast transmitter that transmits the current burst of packets and the subsequent burst of packets, thereby allowing a digital-video-broadcast receiver to enter a reduced power-consumption state for a duration, which is based at least in part on the time-slice parameter, between receiving the current burst of packets and receiving the subsequent burst of packets.

2. The time-slicing digital broadcasting transmitter system of claim 1, wherein the time-slice information specifies, in a way that is independent of a number of data packet-transmission intervals, an amount of time that elapses between transmission of the current packet and transmission of a first-transmitted packet of the subsequent burst of packets.

3. The time-slicing digital broadcasting transmitter system of claim 2, wherein the amount of time that elapses between transmitting the current packet and transmitting the first-transmitted packet of the subsequent burst is determined based at least in part upon an amount of transmitter-idle time between transmission bursts.

4. The time-slicing digital broadcasting transmitter system of claim 1, wherein the time-slice information specifies a time-slice duration for transmitting the current burst of packets.

5. The time-slicing digital broadcasting transmitter system of claim 1, wherein the time-slice information includes a time-slice index for numbering originally transmitted bursts of packets.

6. The time-slicing digital broadcasting transmitter system of claim 1, wherein the buffer is substantially large enough to store at least two full bursts of data from the information service provider and any data to be transmitted between transmission of the two full bursts of data.

7. The time-slicing digital broadcasting transmitter system of claim 6, wherein the amount of time that elapses between transmitting the current packet and transmitting the first-transmitted packet of the subsequent burst is determined based at least in part upon how many packets will be transmitted between transmitting the current packet and transmitting the subsequent packet.

8. The time-slicing digital broadcasting transmitter system of claim 1, wherein the buffer comprises a buffer selected from the group consisting of: an elastin buffer, a first-in, first-out (FIFO)) buffer, a ring buffer, and a dual buffer having separate input and output sections.

9. The time-slicing digital broadcasting transmitter system of claim 1, wherein the encapsulator places the time-slice information into lower layer protocol packet header bits.

10. The time-slicing digital broadcasting transmitter system of claim 9, wherein the lower layer protocol is digital video broadcasting digital storage media command and control (DVB DSM-CC) section protocol.

11. The time-slicing digital broadcasting transmitter system of claim 10, wherein the time-slice information is placed into at least one byte reserved, but not used, for media access control addressing.

12. The time-slicing digital broadcasting transmitter system of claim 1, wherein the time-slice information includes a down-counting packet index for a plurality of packets within the current burst of packets.

13. The time-slicing digital broadcasting transmitter system of claim 1, wherein the time-slice information includes a time slice boundary indication that indicates whether the current packet is a first-transmitted packet of the current burst of packets.

14. A mobile terminal that receives time-slicing digital video broadcast information, the mobile terminal comprising:
   a digital video broadcast receiver that receives a current burst of packets and a subsequent burst of packets, wherein the current burst of packets includes a current packet that includes at least one of digital video content and digital audio content and that includes time-slice information, wherein the current burst of packets and the subsequent burst of packets that have been transmitted by a digital video broadcast transmitter;
   a buffer that receives the current burst of packets and the subsequent burst of packets; and
   an application processor that receives the current packet's buffered content and time-slice information from the buffer and that decodes the current packet's buffered time-slice information thereby extracting information that specifies a relationship between the current packet of the current burst of packets and the subsequent burst of packets, thereby allowing the mobile terminal to enter a reduced power-consumption state for a duration, which is based at least in part on the extracted information, between receiving the current burst of packets and receiving the subsequent burst of packets.

15. The mobile terminal of claim 14, wherein the time-slice information includes a down-counting packet index for a plurality of packets within the current burst of packets.

16. The mobile terminal of claim 15, wherein the time-slice information includes a time slice boundary indication that indicates whether the current packet is a first-transmitted packet of the current burst of packets.

17. The mobile terminal of claim 14, wherein the time-slice information includes an up-counting packet index for a plurality of packets within the current burst of packets.

18. The mobile terminal of claim 17, wherein the time-slice information includes a time slice boundary indication that indicates whether the current packet is a last-transmitted packet of the current burst of packets.

19. The mobile terminal of claim 14, wherein the time-slice information includes a next burst indication that indicates whether the subsequent burst of packets is an original burst or a copy burst.

20. The mobile terminal of claim 14, wherein the time-slice information specifies, in a way that is independent of a number of data packet-transmission intervals, an amount of time between receiving the current packet and a first-received packet of the subsequent burst of packets.

21. The mobile terminal of claim 14, wherein the time-slice information is decoded from lower layer protocol packet header bits.

22. The mobile terminal of claim 21, wherein the lower layer protocol is digital video broadcasting digital storage media command and control (DVB DSM-CC) section protocol.

23. The mobile terminal of claim 22, wherein the time-slice information is decoded from at least one byte reserved, but not used, for media access control addressing.

24. A time-slicing digital video broadcasting system comprising:
   a digital video broadcast transmitter system that transmits bursts of packets, including a current burst of packets and a subsequent burst of packets, wherein the current burst of packets includes a current packet that includes at least one of digital video content and digital audio content from at least one data service of at least one information service provider and that includes time-slice information that specifies a relationship between the current packet of the current burst of packets and the subsequent burst of packets; and
   a digital video broadcast receiver system that receives the current burst of packets and the subsequent burst of packets and that decodes the time-slice information thereby extracting information that specifies the relationship between the current packet and the sub sebsequent burst of packets, thereby allowing the digital video broadcast receiver system to enter a reduoed power-consumption state for a duration, which is based at least in part on the extracted information, between receiving the current burst of packets and receiving the subsequent burst of packets.

25. The time-slicing digital broadcasting system of claim 24, wherein the time-slice information specifies, in a way that is independent of a number of data packet-transmission intervals, an amount of time between transmitting the current packet and a first-transmitted packet of the subsequent burst of packets.

26. The time-slicing digital broadcasting system of claim 25, wherein the subsequent burst of packets is a copy of the current burst of packets.

27. The time-slicing digital broadcasting system of claim 24, wherein the transmitter comprises an encapsulator that places the time-slice information into lower layer protocol packet header bits.

28. The time-slicing digital broadcasting system of claim 27, wherein the lower layer protocol is digital video broadcasting digital storage media command and control (DVB DSM-CC) section protocol.

29. The time-slicing digital broadcasting system of claim 28, wherein the time-slice information is placed into at least one byte reserved, but not used, for media access control addressing.

30. A method of transmitting time-slicing digital video broadcast information, the method comprising:
   buffering at least one of digital video content and digital audio content received from at least one information service provider; and
   forming a plurality of packets of a current burst of packets, wherein the plurality of packets includes portions of the buffered content and a plurality of respective packet headers for the plurality of packets, wherein the packet headers contain time-slice information that specifies a plurality of relationships between the plurality of packets of the current burst of packets and a subsequent burst of packets, thereby allowing a digital-video-broadcast receiver to enter a reduced power-consumption state for a duration, which is based at least in part on the time-slice information, between receiving the current burst of packets and receiving the subsequent burst of packets.

31. The method of claim 30, wherein the time-slice information specifies a plurality of different amounts of time between transmitting a plurality of packets of the current burst and transmitting a first-transmitted packet of the subsequent burst.

32. A computer-readable medium containing computer-executable instructions for transmitting time-slicing digital broadcast information by performing the steps recited in claim 31.

33. The method of claim 30, wherein the time-slice information specifies a plurality of different packet indexes for a plurality of packets of the current burst.

34. The method of claim 30, wherein the time-slice information specifies whether the subsequent burst is a copy of the current burst.

35. The method of claim 30, wherein the time-slice information specifies a duration of the current burst.

36. The method of claim 30, wherein the time-slice information is placed into lower layer protocol packet header bits.

37. The method of claim 36, wherein the lower layer protocol is digital video broadcasting digital storage media command and control (DVB DSM-CC) section protocol.

38. The method of claim 37, wherein the time-slice information is placed into at least one byte reserved, but not used, for media access control addressing.

39. A computer-readable medium containing computer-executable instructions for transmitting time-slicing digital broadcast information by performing the steps recited in claim 38.

40. A computer-readable medium containing computer-executable instructions for transmitting time-slicing digital broadcast information by performing the steps recited in claim 36.

41. A computer-readable medium containing computer-executable instructions for transmitting time-slicing digital broadcast information by performing the steps recited in claim 37.

42. A computer-readable medium containing computer-executable instructions for transmitting time-slicing digital broadcast information by performing the steps recited in claim 30.

43. A method of receiving time-slicing digital video broadcast information, the method comprising:
   receiving a current packet of a current burst of packets and a subsequent burst of packets, wherein the current packet includes time-slice information, wherein the current packet and the subsequent burst of packets include at least one of digital video content and digital audio content from an information service provider and have been transmitted by a digital video broadcast transmitter, wherein the time-slice information specifies a relationship between the current packet of the current burst of packets and the subsequent burst of packets;

buffering the time-slice information; and decoding the buffered time-slice information to extract information that specifies the relationship between the current packet and the subsequent burst of packets, thereby allowing a digital video broadcast receiver to enter a reduced power-consumption state for a duration, which is based at least in part on the extracted information, between receiving the current burst of packets and receiving the subsequent burst of packets.

44. The method of claim 43, wherein the time-slice information specifies, in a way that is independent of a number of data packet-transmission intervals, an amount of time between transmitting the current packet and transmitting the first-transmitted packet of the subsequent burst.

45. A computer-readable medium containing computer-executable instructions for receiving time-slicing digital broadcast information by performing the steps recited in claim 44.

46. The method of claim 43, wherein the time-slice information is decoded from lower layer protocol packet header bits.

47. The method of claim 46, wherein the lower layer protocal is digital video broadcasting digital storage media command and control (DVB DSM-CC) section protocol.

48. The method of claim 47, wherein the time-slice information is decoded from at least one byte that is reserved, but not used, for media access control addressing.

49. A computer-readable medium containing computer-executable instructions for receiving time-slicing digital broadcast information by performing the steps recited in claim 48.

50. A computer-readable medium containing computer-executable instructions for receiving time-slicing digital broadcast information by performing the steps recited in claim 46.

51. A computer-readable medium containing computer-executable instructions for receiving time-slicing digital broadcast information by performing the steps recited in claim 47.

* * * * *

UNITED STATES PATENT AND TRADEMARK OFFICE
CERTIFICATE OF CORRECTION

PATENT NO. : 7,130,313 B2 Page 1 of 1
APPLICATION NO. : 10/075150
DATED : October 31, 2006
INVENTOR(S) : Harri Pekonen It is certified that error appears in the above-identified patent and that said Letters Patent is hereby corrected as shown below:

Column 1, Claim 1, Line 16:
  Please replace "digital broadcasting" with --digital video broadcasting--

Column 16, Claim 8, Line 7:
  Please replace "elastin" with --elastic--

Column 17, Claim 24, Lines 38-39:
  Please replace "sub sebsequent" with --subsequent--

Signed and Sealed this

Third Day of July, 2007

JON W. DUDAS
*Director of the United States Patent and Trademark Office*